US012436287B1

(12) United States Patent
Yang et al.

(10) Patent No.: US 12,436,287 B1
(45) Date of Patent: Oct. 7, 2025

(54) 3-DIMENSIONAL IMAGING LIDAR SYSTEM

(71) Applicant: United States of America as represented by the Administrator of NASA, Washington, DC (US)

(72) Inventors: Guangning Yang, Clarksville, MD (US); Jeffrey R. Chen, Clarksville, MD (US); Hui Li, North Potomac, MD (US); Mark Stephen, Catonsville, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 1106 days.

(21) Appl. No.: 17/387,576

(22) Filed: Jul. 28, 2021

Related U.S. Application Data

(60) Provisional application No. 63/074,163, filed on Sep. 3, 2020.

(51) Int. Cl.
*G01S 17/89* (2020.01)
*G01S 7/484* (2006.01)
(Continued)

(52) U.S. Cl.
CPC ............. *G01S 17/89* (2013.01); *G01S 7/484* (2013.01); *G01S 7/4863* (2013.01); *G01S 7/497* (2013.01)

(58) Field of Classification Search
CPC ...... G01S 17/89; G01S 17/894; G01S 7/4863; G01S 7/486; G01S 7/484; G01S 7/497
See application file for complete search history.

(56) References Cited

U.S. PATENT DOCUMENTS

2007/0104431 A1* 5/2007 Di Teodoro ........ H01S 3/06754
385/123
2008/0158679 A1* 7/2008 Luty .................... G03B 15/006
359/555
(Continued)

OTHER PUBLICATIONS

Mo, Jinyu; He, Logan; Lu, Chao; "A fast tunable semiconductor laser for FBG sensor interrogation systems," 2014, IEEE (Year: 2014).*

*Primary Examiner* — Yuqing Xiao
*Assistant Examiner* — Isabelle Lin Boegholm
(74) *Attorney, Agent, or Firm* — Derek J. Langdon; Matthew F. Johnston; Trenton J. Roche

(57) ABSTRACT

The present invention relates to a lidar system including: laser transmitter and receiver systems, the laser transmitter system including: a wavelength-tunable seed laser which emits pulses at selected wavelength points, and switches between wavelengths within a switching time of <200 ns; a fiber amplifier which amplifies the laser pulses up to 200 kW to a transmitter grating; and a transmitter telescope including primary and secondary mirrors. The laser beam is directed from the transmitter grating to the secondary then primary mirrors, and the first transmitter grating is imaged on the primary mirror to minimize laser beam wander thereon. The transmitter grating diffracts and steers the laser beam by wavelength to a surface, to an arbitrary subset of <2000 resolvable footprints along a cross-track direction at a beam pointing angle switching time of <200 ns, such that footprints illuminated by the laser beam on the surface are imaged in 3D.

17 Claims, 7 Drawing Sheets

(51) Int. Cl.
    *G01S 7/4863*    (2020.01)
    *G01S 7/497*    (2006.01)

(56) References Cited

U.S. PATENT DOCUMENTS

| | | | |
|---|---|---|---|
| 2019/0018115 A1* | 1/2019 | Schmitt | G01S 7/4815 |
| 2019/0107711 A1* | 4/2019 | Blanche | G02B 26/0808 |
| 2019/0146071 A1* | 5/2019 | Donovan | G01S 17/931 |
| 2021/0382370 A1* | 12/2021 | Di Teodoro | G01S 17/26 |
| 2022/0021460 A1* | 1/2022 | Di Teodoro | G02B 5/1814 |

* cited by examiner

3-DIMENSIONAL IMAGING LIDAR SYSTEM

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a next-generation lidar technology capable of swath mapping with multiple tracks with three-dimensional (3-D) imaging capability.

2. Description of the Related Art

Future Earth and planetary science missions call for compact and efficient small satellite (Small-Sat) light detection and ranging (lidar) systems that can range more profiles with 3-D imaging capability. However, spatial coverage and resolution from existing lidar have not been sufficient.

In addition, the landing/docking and lunar orbiting 3-D lidars have significant spatial speckle noise due to small footprint sizes and small receiver apertures.

Further, the linear detector array size is a bottleneck limiting the footprint swath.

Thus, a new lidar system that can incorporate multiple emerging technologies, and substantially reduce size, weight, power (SWaP) and cost, to enable future missions, is needed.

SUMMARY OF THE INVENTION

The present invention relates to a new lidar system that can incorporate multiple emerging technologies, and substantially reduce size, weight, power (SWaP) and cost, to enable next-generation missions.

In one embodiment, the present invention offers a swath-mapping lidar instrument that can entirely map a surface (i.e., gapless swath mapping with contiguous footprints), such as a lunar polar region, at sub-meter resolution, to inform cold-trapped volatile distribution and processes, as well as acquiring, globally, continuous swaths of targets that are key to understanding volcanism and tectonism, particularly on the Moon.

In one embodiment, since the orbit is much lower (50 km vs. 500 km), the telescope size and laser power of the lidar system can both be reduced.

In one embodiment, the present invention provides for a 0.5 m spatial resolution of altimetric data (footprint full-width-at-half-maximum (FWHM)), and 6 cm range precision for each footprint, which is significantly better than the existing 10 cm precision of altimetric data. In addition, the 3.3% reflectance measurement precision can be achieved at a 5 m scale. These precisions are achieved with an order of magnitude higher efficiency over the prior art.

More specifically, in one embodiment, the present invention is a lidar system which rapidly steers a laser beam by wavelength to arbitrarily illuminate up to 2000 resolvable tracks. In one embodiment, the lidar system includes a pulsed, fast tunable laser (up to 5000 wavelength points per msec), amplified by a fiber amplifier, which emits a laser beam which is steered by wavelength to angle dispersion of an optical grating to illuminate across up to 2000 resolvable tracks. Limited by available power, an arbitrary subset of up to 2000 contiguous tracks (e.g., 30) can be dynamically selected and illuminated by one wavelength-steered laser beam and signals from only a subset of the detector super pixels (e.g., 60 signals, two for each track) need to be brought out of the detector cryocooler by an on-chip switch fabric for the selected tracks.

In one embodiment, the laser peak power is reduced to only 4 kW (vs. 100 kW), allowing high-technology readiness level (TRL) commercial ytterbium-doped fiber amplifiers (YDFAs) to be used.

In one embodiment, 1030 nm is the wavelength of choice for the present laser system, allowing a single lidar mission to measure the cryosphere, biosphere, hydrosphere, solid earth and atmosphere.

In one embodiment, the lidar system of the present invention can also operate at eye safe wavelengths of ~1.5 µm or ~2 µm, where laser amplifiers amplify the laser pulses in a wide wavelength tuning range.

In one embodiment, since the laser transmitter only scans within 0.150 angle and the wavelength range is narrow (11.4 nm), excellent imaging quality can be achieved without complicating the optical design.

In one embodiment, the returned laser pulses are detected by a high-quantum-efficiency, single-photon-sensitive mercury cadmium telluride (HgCdTe) avalanche photo diode (APD) linear detector array.

In one embodiment, due to the smaller scanning angle and smaller transmitter telescope, the narrow swath (256 vs. 1100 resolvable footprints) can be imaged onto a much shorter APD array (2×34 vs. 2×320 pixels) that is commercially available with high TRL.

In one embodiment, unwanted sunlight is filtered out using the novel grating-based imaging spectrometer design of the present invention.

In one embodiment, in order to reduce receiver power and data volume, sequential returns from up to ten (10) different tracks are time-division-multiplexed and digitized by a highspeed digitizer for surface ranging. In one embodiment, each track's atmospheric return can be digitized in parallel with an ultra-low-power digitizer at much lower resolution. Precision and accurate 3-D imaging can be achieved with much reduced power, size, weight and cost, enabling new SmallSat missions.

In one embodiment, unlike Earth orbiting lidar, there is no cloud folding issue and only a few detector signals need to be brought out of the detector cryocooler by a switch fabric (e.g., 4 vs. 60). This allows more power saving by reducing both the number of analog-to-digital converters (ADCs) and the thermal load on the detector cryocooler.

In one embodiment, the seed laser needs to sweep the wavelengths sequentially for swath imaging (vs. arbitrary wavelength switching for non-contiguous profiling), allowing a high-TRL commercial fast tunable laser to be used.

The present invention enables unprecedented landing/docking lidar capabilities, allowing one lidar to perform all three required measurements: long range ranging, and velocity measurements at a few footprints, and close-range 3-D imaging with 2k×2k pixels within each sec.

In one embodiment, a lidar system includes: a laser transmitter system; and a receiver system; wherein the laser transmitter system includes: a seed laser system including a wavelength-tunable seed laser about a center wavelength which emits laser pulses of a laser beam at selected wavelength points, and switches from one wavelength to another wavelength within a switching time of less than 200 ns; a fiber amplifier which amplifies the laser pulses up to 200 kW and collimates the laser beam; a first transmitter grating which receives the laser beam from the fiber amplifier; a transmitter telescope, including a primary mirror and a secondary mirror; and a pair of relay lenses or mirrors; wherein the laser beam is directed from the first transmitter grating via the pair of relay lenses or mirrors, to the secondary mirror and then to the primary mirror, to image the first transmitter grating on the primary mirror, in order to minimize laser beam wander on the primary mirror; and wherein the first transmitter grating diffracts and steers the collimated laser beam from the fiber amplifier by wavelength via the primary mirror to a surface, to an arbitrary subset of up to 2000 resolvable footprints along a cross-track direction on the surface at a beam pointing angle switching time of less than 200 ns, such that the footprints which are illuminated by the laser beam from the first transmitter grating on to the surface are imaged in three-dimensions (3D).

In one embodiment, the center wavelength of the laser transmitter system and a receiver wavelength of the receiver system are centered about any laser wavelength including one of a 1035 nm, a 1550 nm a 2050 nm, or a 518 nm wavelength.

In one embodiment, the receiver system includes: a receiver telescope including a primary mirror and a secondary mirror, the receiver telescope which collects return laser pulses of the laser beam returning from the surface; a first receiver grating which filters out solar background radiation spatially and spectrally for all footprints illuminated by the laser beam returning from the surface with different wavelengths; and a linear detector array on which the footprints from the surface are imaged; wherein the return laser beam from a central footprint of the footprints, at the center wavelength, travels along an optical axis from the receiver telescope to the linear detector array; and wherein the footprints are distributed across multiple of detector pixels, such that a solar background noise and a detector dark-noise on each pixel of the linear detector array are decreased while a bandwidth of the linear detector array is increased.

In one embodiment, the receiver system further includes: an entrance slit disposed between the receiver telescope and the first receiver grating; wherein the footprints on the surface are imaged by the receiver telescope onto the entrance slit which is oriented along the cross-track direction to allow images of the footprints to pass while limiting a receiver individual field of view (iFOV) of each of the footprints in an along-track direction; wherein successive footprints on the surface illuminated by the laser beam at a fixed cross-track pointing angle forms a track of footprints in the along-track direction; and wherein the receiver iFOV of each of the footprints in the cross-track direction is limited by a width of no more than two detector pixels.

In one embodiment, the receiver system further includes: an exit slit disposed between the first receiver grating and the linear detector array; wherein a groove direction of the first receiver grating is rotated by an angle $\theta_1$ from the entrance slit around the optical axis such that a relatively longer wavelength of one of the footprints corresponds to a relatively larger incident angle to the first receiver grating; wherein the exit slit and the linear detector array are rotated by an angle $\theta_2$ from the groove direction of the first receiver grating around the optical axis to align with the images of the footprints; and wherein the angle $\theta_1$ is selected according to one of a following a) to c):

a) wherein the angle $\theta_1$ is selected such that the angle $\theta_2$ becomes identical to the angle $\theta_1$ to reduce a length of the linear detector array while reducing a solar photon rate on each of the detector pixels; or b) wherein the angle $\theta_1$ is selected as greater than the angle $\theta_1$ in a) to decrease the length of the linear detector array as compared to the length of the linear detector array in a), while the solar photon rate on each of the detector pixels is increased compared to the solar photon rate in a); or c) wherein the angle $\theta_1$ is selected as less than the angle $\theta_1$ in a) to decrease the solar photon rate as compared to the solar photon rate in a), on each of the detector pixels while the length of the linear detector array is increased as compared to the length of the linear detector array in a).

In one embodiment, the receiver system further includes: a first collimating lens disposed between the entrance slit and the first receiver grating; a delivery lens disposed between the receiver telescope and the first collimating lens configured to image the primary mirror of the receiver telescope onto the first receiver grating, to minimize beam wander on the first receiver grating; an optical filter disposed between the first collimating lens and the receiver grating, which rejects solar photons below a minimum operating wavelength of said laser transmitter system from collimated light from said first collimated lens; a first focusing lens disposed between the first receiver grating and the exit slit, which focuses the return laser beam diffracted by the first receiver grating, onto the exit slit, which allows images of the footprints on the surface to pass while blocking the solar background radiation dispersed by the first receiver grating; a second collimating lens disposed between the exit slit and the linear detector array; and a second focusing lens disposed between the second collimating lens and the linear detector array, the second focusing lens which re-images the footprints passing through the exit slit and the second collimating lens onto the linear detector array; wherein the first collimating lens and the first focusing lens are disposed proximate to the first receiver grating to reduce beam wander on both the first collimating lens and the first focusing lens; and wherein the second focusing lens is one of a separate lens or combined into a single imaging lens with the second collimating lens.

In one embodiment, the receiver system further includes: a folding mirror disposed between the entrance slit and the first receiver grating, which folds the optical axis by 90° from that of the receiver telescope towards the first receiver grating whose grooves are disposed parallel to the optical axis of the receiver telescope; wherein the angle $\theta_1$ between the grooves of the first receiver grating and an image of the entrance slit mirrored by the folding mirror is set to a value of said angle $\theta_1$ by rotating the folding mirror and all downstream optics around the optical axis of the receiver telescope such that an angle between the folded optical axis and the entrance slit is identical to the selected value of 01.

In one embodiment, a laser linewidth of the footprints is broadened to increase a number of coherent intervals $M_t$ within a laser pulse duration to more than 10 to reduce a ranging variance from a speckle noise by a factor of $M_t$; wherein an optical frequency spacing of the resolvable footprints as high as 12.5 GHz allows for speckle noise reduction without super-linearly increasing the solar photon rate on each of the detector pixels; and wherein on condition that the speckle noise is reduced, a plurality of relatively weaker laser pulses is combined into a single relatively stronger laser pulse and a size of the collimated beam to the first receiver grating is reduced without increasing relative range variance contributions from the speckle noise and the solar background noise, as compared to the relative range variance contributions from unreduced speckle noise and the solar background noise when the collimated beam to the first receiver grating is unreduced in size.

In one embodiment, a broadening of the footprints due to the laser linewidth broadening is canceled by enlarging the laser beam transmitted to the surface to reduce laser beam divergence while maintaining an unchanged angular separation between adjacent of the footprints.

In one embodiment, one of the entrance slit or the exit slit is curved to match a curved locus of the images of the footprints on respective of the entrance slit or the exit slit.

In one embodiment, the receiver system further includes: a second receiver grating disposed between the second collimating lens and the second focusing lens to correct for a smile on the linear detector array; wherein the first receiver grating and the second receiver grating are identical, and the second collimating lens and the first focusing lens are identical; and wherein the first and second receiver gratings and the first focusing lens and the second collimating lens are in mirror symmetry about the exit slit such that an incident angle of the second receiver grating is identical to a diffracted angle of the first receiver grating, making a locus of footprint images on the detector array a straight line.

In one embodiment, the lidar system further includes: a plurality of electronics, the plurality of electronics including: at least one relatively high-speed analog-to-digital converter (ADC); a plurality of relatively low-speed ADCs, one of the ADCs which samples a signal of a detector super pixel illuminated by one of a track of footprints on the surface, to record atmospheric returns in parallel; at least one time-division multiplexer each of which multiplexes up to 10 detector super pixel signals from different tracks of footprints on the surface returned at different times, into one signal to be digitized by one of the relatively high-speed ADCs for surface ranging; and a field-programmable gate array (FPGA) processor which controls the relatively high-speed ADC and the relatively low-speed ADCs, the at least one time-division multiplexer, and lidar system operation.

In one embodiment, the seed laser system includes: an optical Mach-Zehnder modulator (MZM) which synchronously carves an output of the seed laser amplified by a seed laser fiber amplifier, into laser pulses of a minimum of 2 ns at selected wavelengths; a MZM bias controller; at least one digital-to-analog converter (DAC); and an adder; wherein the FPGA controls the at least one DAC to generate a relatively fast feedforward signal, which is added to a relatively slow feedback signal from the MZM bias controller using the adder to bias the MZM at a null point by tracking a wavelength change and adjusting a bias voltage to the MZM to minimize leakage for all wavelengths.

In one embodiment, the linear detector array is an avalanche photodiode (APD) linear detector array; and wherein an "m" by "n" pixel detector chip is bonded on top of an "m" by "n" transimpedance amplifier (TIA) array, and a plurality of TIAs in each column of "m" pixels are combined with a summer into a single signal for each super pixel.

In one embodiment, the linear detector array includes a single photon sensitive mercury-cadmium-telluride (HgCdTe) APD detector array with up to 320 super pixels.

In one embodiment, the linear detector array includes a readout integrated circuit (ROIC) which includes an "n" to "$2n_{track}$" RF switch fabric which is dynamically configured to connect "$2n_{track}$" out of "n" switch inputs selected arbitrarily to "$2n_{track}$" switch outputs, to reduce a number of ROIC output signals; wherein "n" switch inputs are connected to outputs of "n" super pixels such that the RF switch fabric brings out signals from "$2n_{track}$" super pixels arbitrarily illuminated by "$n_{track}$" tracks of footprints on the surface; wherein "n" is configured to be 320 and "$2n_{track}$" is configured to be 60 for 30 tracks of footprints; and wherein the switch fabric is controlled by the FPGA and reconfigured when surface footprint locations are changed dynamically.

In one embodiment, the laser beam transmitted to said surface sweeps contiguous footprints in a swath for gapless 3D imaging on an airless body, and the RF switch fabric in the ROIC of the linear detector array is modified to track the laser beam with no more than four switch outputs; and wherein outputs of the modified RF switch fabric are dynamically connected to a group of contiguous detector super pixels onto which a moving laser footprint is imaged.

In one embodiment, on condition that said group contains only two super pixels to image said footprint, a number of ROIC output signals is reduced to two.

In one embodiment, upon each switch trigger from the FPGA, on condition that a laser footprint image moves out a trailing super pixel in the group, a switch output connected to the trailing super pixel is switched to a super pixel ahead of and adjacent to a leading super pixel of the group, to track the moving laser footprint image; and the modified RF switch fabric wraps around to a beginning of a super pixel array when reaching an end of the super pixel array.

In one embodiment, gapless swath-mapping of the surface is performed by repeating a set of interlaced wavelength sweeps to mitigate cloud folding from a cloud top up to 19 km while allowing a plurality of the laser pulses to be transmitted within each sweep duration as low as 125 μs; wherein a plurality of the footprints illuminated in a wavelength sweep are imaged onto different super pixels of the linear detector array and the footprints are shifted by one footprint full-width-at-half-maximum (FWHM) in a following sweep to form the gapless 3D imaging; and wherein successive sweeps are separated by more than 125 μs such that intervals of consecutive pulses on each super pixel of the linear detector array are more than 125 μs.

In one embodiment, a pseudo-random pulse position modulation (PRPPM) is used to resolve range ambiguity by shifting intervals of multiple consecutive laser pulses for each of the tracks of footprints from a constant pulse repetition period by a predetermined pseudo-random offset, such that a PRPPM sequence of consecutive laser pulses is repeated to resolve range ambiguity within a duration of the PRPPM sequence.

In one embodiment, different tracks of footprints may use orthogonal PRPPM codes to suppress optical interference among the tracks of footprints.

In one embodiment, the PRPPM pulse interval is constant.

In one embodiment, a burst of PRPPM pulses is transmitted at one wavelength before moving to another wavelength, reducing a range variance due to surface height variations along one track of the tracks of footprints.

In one embodiment, the seed laser system in the laser transmitter system includes: a laser driver board on which the seed laser is supported; wherein the DACs adjust currents of a plurality of current drivers to drive the seed laser; a semiconductor optical amplifier (SOA) used to synchronously carve the laser pulses at selected wavelengths; a temperature controller which stabilizes a temperature of the seed laser; a first ytterbium (Yb)-fiber amplifier which amplifies a laser output from the seed laser; a second ytterbium (Yb)-fiber amplifier which amplifies a laser pulse train from the MZM; a first radio frequency (RF) amplifier which drives the MZM; an acousto-optic modulator (AOM); and a second radio frequency (RF) amplifier which drives the AOM; wherein the AOM gates the amplified laser pulse train from the second Yb-fiber amplifier to suppress optical leakage between the laser pulses and amplified spontaneous emission (ASE) from the (Yb)-fiber amplifiers; and wherein the laser beam emitted from said AOM of the seed laser is further amplified by the fiber amplifier and dispersed by the first transmitter grating of the laser transmitter.

In one embodiment, the seed laser further includes: a pulse carving control system triggered by the FPGA, the pulse carving control system which sends RF pulses to the first RF amplifier and the second RF amplifier to carve the amplified laser beam into 2 ns laser pulses with the MZM, and gate the amplified laser pulse train with the AOM.

In one embodiment, the lidar system further includes: a laser reference system (LRS) including a star camera which monitors a star field, the LRS being disposed downstream from the primary mirror of the transmitter telescope, the LRS which monitors the beam pointing angle of the laser beam transmitted to the surface and a field of view (FOV) pointing of the receiver system relative to the star field; a lateral transfer retro-reflector (LTR) disposed between the primary mirror and the LRS which picks off a small fraction of transmitted beam coming out of the transmitter telescope and directs the picked-off beam to the LRS; and a lens disposed between the LRS and the LTR; wherein the lens focuses the picked-off beam and focuses a plurality of tracing beams from the receiver system such that based on the monitoring of the beam pointing angle by the LRS, the LRS feedbacks a beam pointing angle error signal to the seed laser to correct a laser wavelength and the beam pointing angle.

In one embodiment the lidar system further includes a plurality of electronics, including: a control system, which includes the FPGA processor, the control system which controls the seed laser; a data storage; a global positioning system (GPS); and a communication module; wherein the control system controls lidar operation and streams processed raw data to the data storage; wherein the GPS provides positioning and timing of the lidar system and outputs a signal to the FPGA; and wherein the raw data is downloaded to ground via a communication link using the communication module.

In one embodiment, the transmitter grating and the receiver grating are fused silica transmission gratings, with greater than 94% diffraction efficiency across over a 30 nm wavelength range for both polarizations.

In one embodiment, the laser transmitter system further includes: a second transmitter grating disposed downstream from the first transmitter grating to pre-distort a locus of the footprints on the surface to correct for the smile on the linear detector array; wherein the second transmitter grating has an identical groove density as the first receiver grating; wherein a beam size onto the second transmitter grating is such that the beam size is expanded by the transmitter telescope by a same factor as a beam reduction factor from the return laser beam on an aperture of the receiver telescope to the first receiver grating; wherein the second transmitter grating is oriented in mirror symmetry with the first receiver grating such that a diffracted angle of the second transmitter grating is identical to an incident angle for the first receiver grating, and a diffracted angle of the first receiver grating is identical to an incident angle of the second transmitter grating.

In one embodiment, the second transmitter grating is disposed downstream from the transmitter telescope on condition that the beam reduction factor of the return laser beam on the first receiver gating is unity.

In one embodiment, the lidar system further includes: a 2-D steering mirror which scans both the laser beam transmitted to the surface and a field-of-view (FOV) of the receiver system in an eight-pass rolling and direction-flipping pattern while the transmitted laser beam sweeps by wavelength across contiguous footprints in the cross-track direction, and the receiver system images the contiguous footprints on the linear detector array; wherein the contiguous footprints on the surface form a gapless broom and the 2-D steering mirror scans and produces a gapless 3-D image over a swept surface area; and wherein the beam pointing angle of the gapless broom is swept by said 2-D steering mirror up and down across a full along-track angular range, and a curve of the cross-track pointing angle as a function of time is a triangle wave with corners of the triangle wave replaced by a half period of a sine function, which makes an along-track angular speed and acceleration continuous and reduced.

In one embodiment, a duration of the half period of a sine function for along-track speed reversal is up to 28% of a full along-track sweep duration to reduce along-track angular steering acceleration, speed, and bandwidth of the steering mirror.

In one embodiment, the 2-D steering mirror ramps the beam pointing angle of the gapless broom along the cross-track direction among eight fixed angles evenly spaced by ⅛ of a full cross-track angular range and the gapless broom spans at least the cross-track angular spacing; and wherein the cross-track pointing angle rolls from a smallest to a largest of the eight fixed angles by repeating a rolling cycle, which reduces overlapping footprints, and angular steering bandwidth, peak angular speed and acceleration of the steering mirror.

In one embodiment, at a start of the rolling cycle, the cross-track pointing angle dwells on a fixed angle while the along-track pointing angle is swept linearly in an initial direction, and then ramps forward by ½ of the full cross-track angular range to a next fixed angle while the along-track pointing angle sweep is reversed; and wherein the cross-track pointing angle dwells on the next cross-track fixed angle while the along-track pointing angle is swept linearly in reversed direction, and subsequently ramps back by ⅜ of the full cross-track range to a following fixed angle while the along-track pointing angle sweep is reversed to the initial direction, ending the rolling cycle.

In one embodiment, a ramping curve of the cross-track pointing angle from one to another fixed angle as a function of time is a sum of a linear ramp and a period of a sine function which makes cross-track angular speed and acceleration continuous and reduced.

In one embodiment, a duration of the cross-track ramming curve from one to another fixed angle is longer than the duration for along-track speed reversal to reduce required cross-track angular steering acceleration, speed and bandwidth of the steering mirror.

In one embodiment, the cross-track pointing angle rolls back from a largest to a smallest of the eight fixed angles by repeating the rolling cycle in reversed cross-track ramping direction and reversed along-track sweeping direction, starting as the cross-track pointing angle dwells on the largest of the eight fixed angles while the along-track pointing angle is swept linearly in the reversed direction.

In one embodiment, the eight-pass rolling pattern is substituted by another even number of passes, including one of 4, 6, or 10 passes.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

Figure 1:
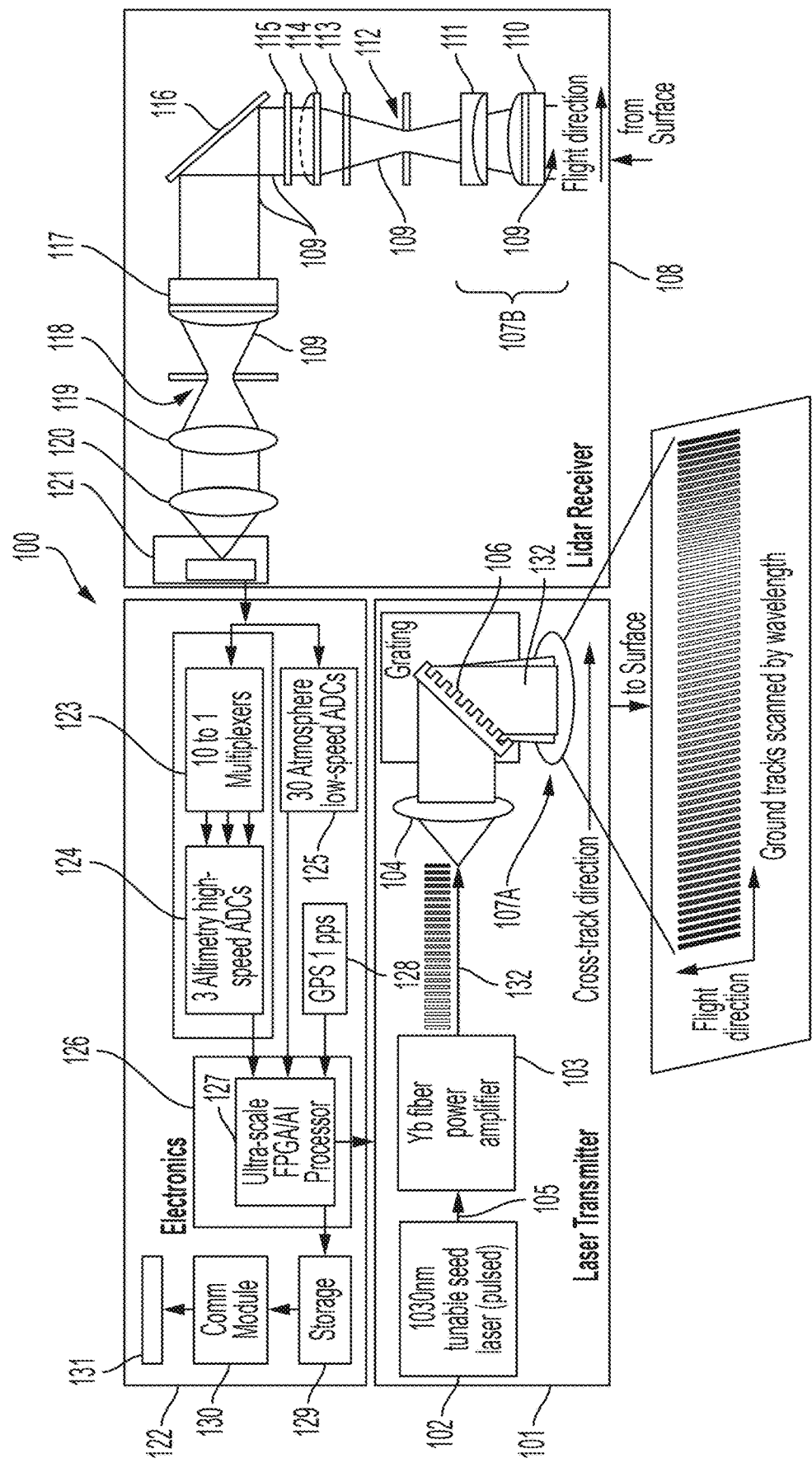
FIG. 1 is a schematic diagram of the fast-wavelength-steering 3-D imaging lidar system, according to one embodiment consistent with the present invention.

The present invention relates to a new lidar system that can incorporate multiple emerging technologies, and substantially reduce size, weight, power (SWaP) and cost, to enable next-generation missions. The breakthrough lidar technology of the present invention can dramatically increase the efficiency and flexibility compared to prior spaceflight lidar instruments, enabling new observation capabilities.

In one embodiment, the highly efficient novel lidar system 100 of the present invention (see FIG. 1) utilizes four key emerging technologies: 1) a fast-tunable seed laser 102; 2) a high peak-power fiber amplifier 103; 3) high-performance transmission gratings (transmitter grating 106 and receiver grating 116), and 4) a linear-mode, photon-sensitive detector array 121 disposed in a novel lidar receiver 108.

The lidar 100 of the present invention measures the time of flight (TOF) of each laser pulse (for range) emitted by the laser transmitter 101, and the transmitted and return energy (laser beam) (for surface reflectance). In one embodiment, with no moving parts in the present invention, the laser transmitter 101 can rapidly steer a single high-power laser beam 132 across up to 2000 resolvable footprints (separated by the full-width-at-half-maximum (FWHM) of the footprint), dynamically reconfiguring the distribution of the laser footprints across 2000 resolvable footprints.

In one embodiment, the fast beam steering of the lidar system 100 of the present invention is achieved by using an innovative, high-speed, wavelength-tuning technology and wavelength-to-angle-dispersion with a grating 106.

In one embodiment, the innovative receiver optical filter design of the present invention rejects solar background for all transmitted wavelengths by using a single grating 116.

Accordingly, the high efficiency of the lidar 100 of the present invention allows orders of magnitude more measurements than previous planetary lidars and enables imaging wide (more than 100 m) swaths at sub-meter resolution without gaps. Thus, precision and accurate 3-D imaging can be achieved by the present invention with much reduced power, size, weight and cost, enabling new SmallSat missions.

In one exemplary embodiment, an Earth orbiting 1030 nm lidar 100 will be used as an example to explain the technology. The orbit is 500 km above the surface and the receiver aperture diameter is 0.4 m. The Gaussian beam footprint on the surface is as small as 6 m FWHM diameter ($1/e^2$ diameter is 10.2 m).

In one embodiment, the lidar system 100 of the present invention includes:
1) a laser transmitter 101 having: a) a high-speed, wavelength-tunable seed laser 102 which rapidly switches the wavelength arbitrarily up to 30 nm wavelength band around 1035 nm, and fires pulses at selected wavelength points; b) a high-power fiber amplifier 103 which amplifies the pulses; and c) a wavelength-to-angle mapping grating 106 to steer the laser beam to different footprint locations;
2) a lidar receiver system 108 having a linear-model, photon-sensitive detector array 121, and a diffractive grating 116 for rejection of solar background noise; and
3) electronics 122 including an ultra-scale field-programmable gate array (FPGA)/artificial intelligence (AI) processor 127.

Laser Transmitter

In one embodiment, a pulsed, fast wavelength-tunable seed laser 102 (up to 5000 wavelength points per msec) about a center wavelength emits laser pulses of a laser beam at selected wavelength points, the laser beams which is amplified by a fiber amplifier 103 up to 200 kW, and the beam 132 is collimated by lens 104 and diffracted by the transmitter grating 106. In one embodiment, the laser transmitter system 101 and a receiver wavelength of said receiver system 108 is centered about any laser wavelength including one of a 1035 nm, a 1550 nm a 2050 nm, or a 518 nm wavelength. In one embodiment, the lidar system of the present invention can also operate at eye safe wavelengths of ~1.5 μm or ~2 μm, where laser amplifiers amplify the laser pulses in a wide wavelength tuning range.

In one embodiment, the diffracted beam 132 from the transmitter grating 106 is expanded by the telescope 107A (see FIG. 3) and transmitted to the surface. The beam 132 can be steered to arbitrarily illuminate a subset of up to 2000 resolvable footprints (along "cross-track" direction as shown in FIG. 1) on the surface by a 7 cm-wide transmitter grating 106 (1500-1600 lines/mm), with no moving parts, such that footprints that are illuminated by the laser beam from the transmitter grating 106 on to the surface are imaged in 3-D.

Figure 3:
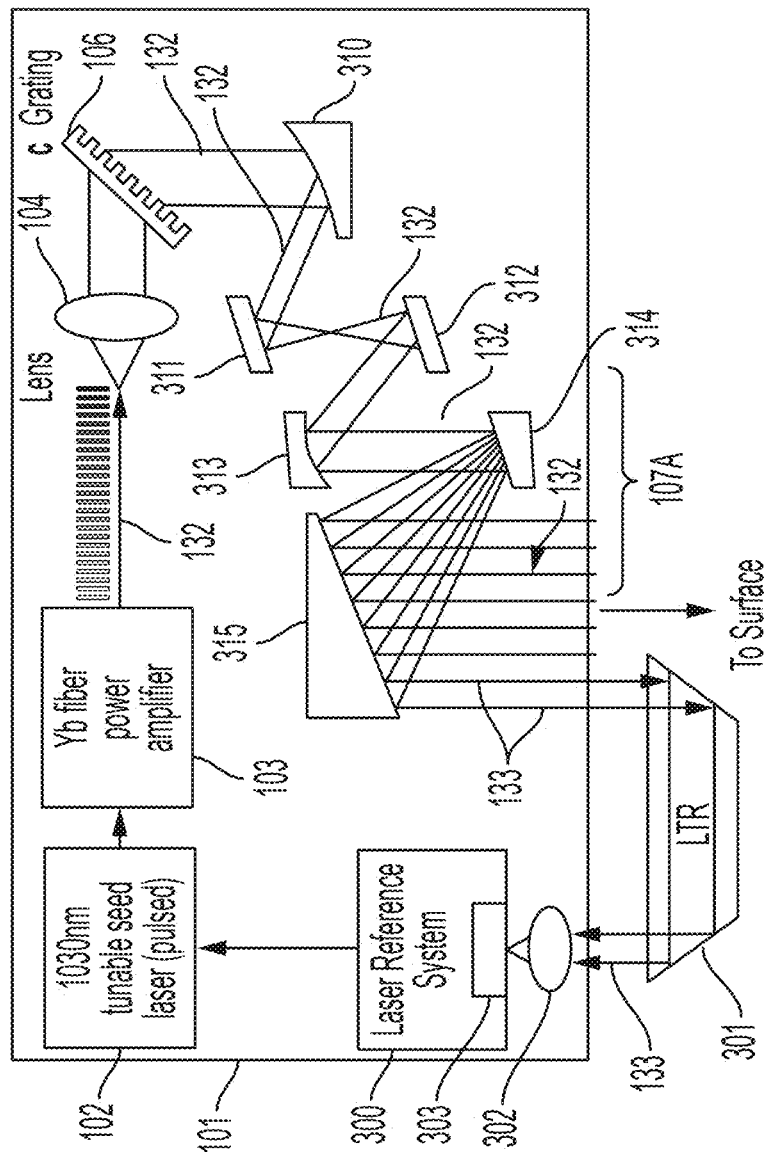
FIG. 3 is a schematic diagram of a laser reference system included with the laser transmitter of the lidar system, according to one embodiment consistent with the present invention.

As shown in FIG. 3, the Transmitter (TX) telescope 107A includes a secondary mirror 314 and primary mirror 315. To minimize the unwanted beam wander on the TX primary mirror 315, two delivery mirrors 310, 313, along with two folding mirrors 311 and 312 are inserted to image the TX grating 106 onto the TX primary mirror 315. The return laser beam 109 from the surface is collected by the Receiver (RX) telescope 107B (comprising a primary mirror 110 and a secondary mirror 111) and imaged onto the entrance slit 112.

In one embodiment, the optical grating 106 translates a wavelength change into an angular change of the boresight cross-track position.

In one embodiment, the transmitter grating 106 of the present invention is made of fused silica featuring high diffraction efficiency (more than 94%) for both polarizations concurrently, and are less sensitive to alignment variation and deformation, and allows more compact optical design.

Figure 2:
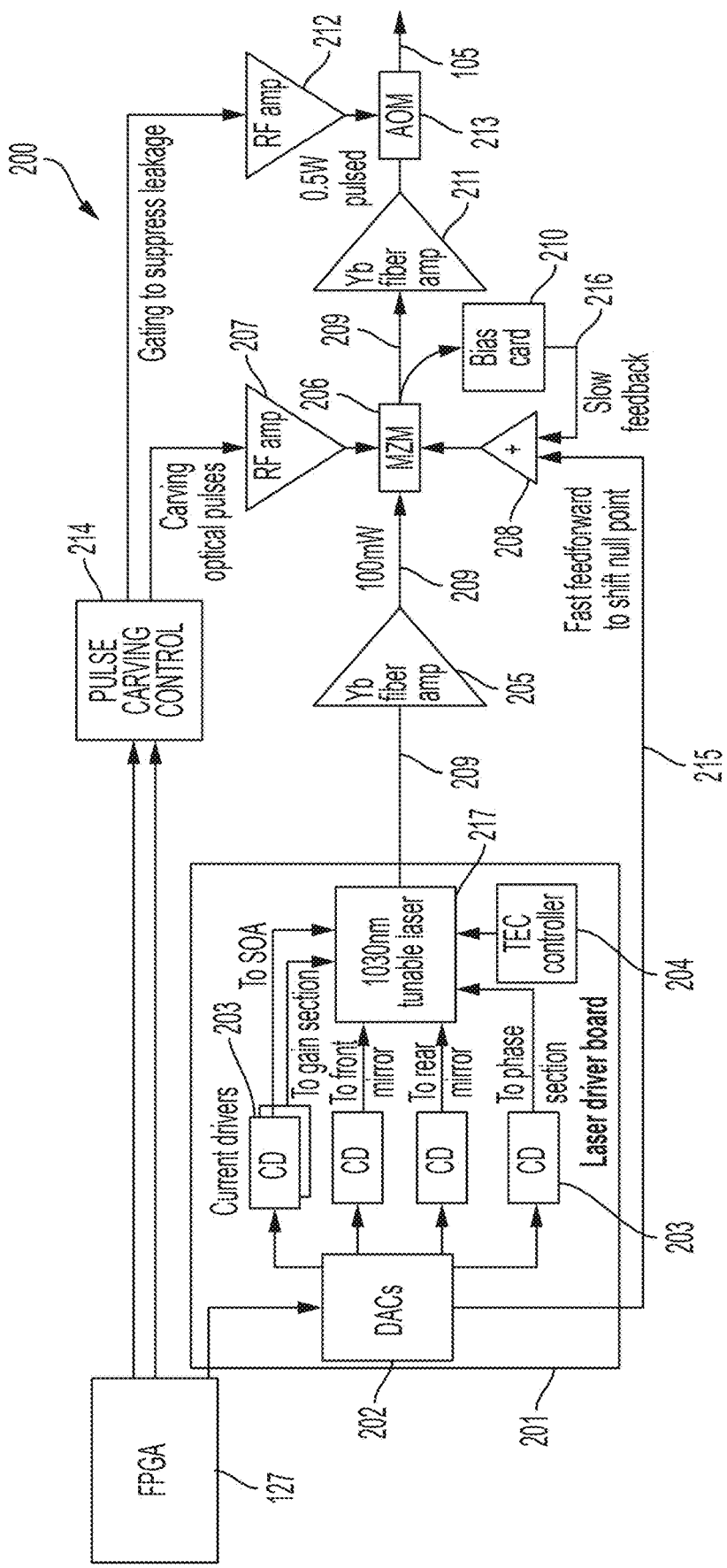
FIG. 2 is a schematic diagram of the seed laser system of the lidar system, according to one embodiment consistent with the present invention.

In one embodiment, the seed laser 102 (see seed laser system 200 in FIG. 2, discussed in detail below) is fast-wavelength-switched to and from any of the 1100 wavelength points with 7.5 GHz spacing within a wavelength tuning range up to 30 nm around 1035 nm.

In one embodiment, the laser transmitter 101 sweeps across only 11.4 nm to scan 256 resolvable footprints to reduce the laser transmitter 101 power consumption compatible with expected lunar orbital platforms. However, more footprints can be illuminated for in future designs. In this embodiment, since the laser transmitter only scans within 0.150 angle and the wavelength range is narrow (11.4 nm), excellent imaging quality can be achieved without complicating the optical design.

Accordingly, unlike multi-beam, spaceflight lidars in the prior art, the present invention retains the full pulse energy for each footprint by beam steering rather than beam splitting. In one embodiment, the beam steering enables time division multiplexing of the returned signals from different tracks. This allows the fiber amplifier 103 to operate at a higher duty cycle and lower peak power, increasing the laser wall-plug efficiency to 13% (vs. <7% for existing systems), and avoiding excessive non-linear effects.

In one embodiment, the wavelength-to-angle dispersion of the grating 106 of the present invention enables fast steering of the high-power laser beam for 3D lidar imaging at the high speed of the fast and arbitrarily laser wavelength switching from one wavelength to another wavelength (<200 ns switching time), with wide steering range (to 2000 resolvable footprints) with no moving parts. The present invention can illuminate any tracks arbitrarily and dynamically selected among the 2000 resolvable tracks.

This is not possible with prior art technologies such as optical phased arrays (low power, <200 resolvable beam spots), electro-optic and acousto-optic (<100 resolvable spots), liquid crystal beam deflectors (low power, slow, <100 resolvable spots), micro-electro-mechanical system (MEMS) mirrors (slow, <300 resolvable spots), and mechanical beam deflectors (slow with moving parts). Further, prior art technologies of laser beam steering by wavelength were limited to low laser peak power, monotonic wavelength tuning (incapable of arbitrary wavelength/angle switching), and employed inferior gratings to the transmission gratings 106 used in the present invention. In addition, the fiber laser amplifier 102 of the present invention allows better beam pointing to achieve the present small footprints as compared to the pointing instability of free-space lasers that enlarge footprints.

Lidar Seed Laser Control System

In one embodiment, the seed laser control system 200 (laser system 102 in FIG. 1) includes the tunable laser 217 (i.e., a 1030 nm tunable laser) (see FIG. 2) which is supported on a laser driver board 201. The laser driver board 201 includes a plurality of digital-to-analog-converters (DACs) 202 controlled by a field-programmable-gate-array (FPGA) 127 of the electronics 126 to adjust the currents of the current drivers 203 which drive the tunable laser 217. The drivers' 203 signals are outputted to the gain section, front mirror, rear mirror, phase section, and gain section (none shown) and semiconductor optical amplifier (SOA) (not shown) of the tunable laser 217. A thermoelectric cooler (TEC) digital temperature controller 204 stabilizes the temperature of the tunable laser 217.

In one embodiment, the laser output 209 is amplified by a ytterbium (Yb)-fiber amplifier (YDFA) 205 to emit a 100 mW beam 209, which is synchronously carved into 2 ns pulses at the selected wavelengths by an optical Mach-Zehnder modulator (MZM) 206. In one embodiment, this optical pulse train is subsequently amplified with another YDFA 211 up to an average optical power of about 0.5 W. In one embodiment, the amplified pulse train is gated by an acousto-optic modulator (AOM) 213 to suppress optical leakage between pulses and amplified spontaneous emission (ASE) from the laser amplifiers. In one embodiment, the resulting beam 105 is further amplified by the high power YDFA 103 as illustrated in FIG. 1.

As shown in FIG. 1, in one embodiment, the output of power amplifier 103 is dispersed by transmitter grating 106 and launched to the surface by the telescope 107A. In one embodiment, the MZM 206 and the AOM 213 are driven by pulsed radio frequency (RF) amplifiers 207 and 212, respectively. In one embodiment, the FPGA 127 triggers the pulse carving control electronics 214 that sends RF pulses to RF amplifiers 207 and 212, to carve optical pulses with the MZM 206 and gate the optical pulses with the AOM 213.

In one embodiment, the FPGA 127 controls a DAC 202 to generate a fast feedforward signal 215 to compensate the bias voltage of the MZM 206. In one embodiment, using an adder 208 to bias the MZM 206 at a null point by tracking a wavelength change, this fast feedforward signal 215 is added to a slow feedback signal 216 from a MZM bias controller (i.e., bias card (system) 210), to adjust a bias voltage and minimize the MZM leakage. When the wavelength is rapidly changed, the bias card feedback signal is too slow to follow the MZM null point, resulting in unwanted leakage between optical pulses. In one embodiment, the feedforward signal 215 tracks the wavelength change and rapidly adjusts the MZM 206 bias voltage to the MZM 206 to minimize the leakage for all wavelengths.

In one embodiment, the SOA of tunable laser 217 can be used to carve optical pulses with longer pulse width (e.g., 50 ns). In one embodiment, the MZM 206 will carve these longer pulses into shorter ones. In one embodiment, these pulses can be amplified to a much higher peak power by the YDFA 205 to an average optical power of 100 mW, to relieve the burden on the following YDFAs 211, 103 and improve the on/off extinction ratio of the transmitted pulses.

In one embodiment, the tunable laser module 201 provides tuning step triggers and sweep triggers to the pulse carving control 214, to control the MZM pulse carving and AOM pulse gating.

Thus, according to one embodiment of the present invention for an Earth orbiting lidar at 500-km orbit, the seed laser 102 is fast wavelength switched to and from any wavelength points within 30 nm range (centered at 1035 nm, for example), to steer the transmitted laser beam 132 across 1100 contiguous tracks on Earth (6.6-km swath for 6 m laser footprint FWHM). The laser frequencies for these resolvable tracks are 7.5 GHz (26.9 pm) apart. In one embodiment, limited by the vehicle (e.g., spacecraft) power, 30 out of the 1100 tracks can be dynamically selected. To achieve 5-cm range precision per pulse, the peak power of each 2 ns transmitted pulses is as high as 100 kW (213 µJ pulse energy) and the TX telescope 107A aperture is 0.4 m. The pulsed tunable seed laser 102 is pulsed up to 240 kHz while each wavelength is pulsed at no more than 8 kHz to mitigate unwanted cloud folding. The 1030 nm wavelength compares favorably to 0.5 µm (low reflectance of vegetation) or 1.5 µm (very low reflectance of snow and ice).

In one exemplary embodiment for a lunar orbiting lidar at 50-km orbit, the wavelength sweep over 11.4 nm (centered at 1035 nm) is repeated at 3.27 kHz so that at the notional ground speed of 1635 m/s the footprints advance 0.5 m along track per sweep for gapless imaging. 256 contiguous footprints (0.5-m HWHM) are scanned with 12.5 GHz steps in each sweep, covering a swath of 128 m with a pulse rate of 837 kHz. To achieve 6-cm range precision per pulse, the peak power of each transmitted 2 ns pulses is only 4 kW (8.5 µJ pulse energy) and the telescope aperture is reduced to 0.2 m. For airless bodies such as the Moon, there is no cloud folding issue so the pulse rate on each detector pixel can be as high as 5 MHz. A 1035 nm wavelength is chosen instead of 1550 nm because the transmitter aperture can be much smaller (i.e., 124 mm vs. 201 nm), and the ytterbium-doped fiber amplifiers (YDFAs) 103 for 1035 nm are much more efficient (about 20%) than erbium-doped fiber amplifiers (EDFAs) for 1550 nm (about 7%).

In this embodiment, the present invention provides for a 0.5 m spatial resolution of altimetric data (footprint FWHM), and 6 cm range precision for each footprint, which is significantly better than the existing 10 cm precision of altimetric data. In addition, the 3.3% reflectance measurement precision can be achieved at a 5 m scale. These precisions are achieved with an order of magnitude higher efficiency over the prior art.

In one embodiment, as illustrated in FIG. 3, the TX optics includes two small relay lenses or mirrors 311, 312 which can be inserted between the transmitter grating 106 and the telescope 107A to image the transmitter grating 106 onto and the primary mirror 111 of the TX telescope 107A, to minimize laser beam 132 wander on the primary mirror 315.

The present invention also provides for a laser reference system (LRS) 300 (see FIG. 3) to monitor transmitted beam pointing. In one embodiment, a small fraction 133 of the transmitted beam 132 can be picked off using a lateral transfer retro-reflector (LTR) 301 and directed to the LRS 300. The LRS 300 contains a star camera 303 that has CCD sensors (not shown) in both the frontside and backside. The LRS 300 incorporates a star tracker (not shown) that monitors the star field using the frontside of the star camera 303. A lens 302 focuses the small fraction 133 of the transmitted beam 132 and several tracing beams (not shown) from the receiver 108 onto the backside of the star camera 303, which monitors the laser beam pointing angle and the field of view (FOV) pointing of the receiver 108 relative to the star field. The LRS 300 monitors the beam pointing angle and feedbacks the beam pointing angle error signal to correct the laser wavelength (hence, the beam pointing angle). With the LRS 300, a fast wavelength control feedback loop is no longer needed, greatly simplifying the lidar design, and enabling faster wavelength tuning speed.

Lidar Imaging Receiver

In one embodiment, the compact 3-D imaging lidar receiver 108 (FIG. 1) images footprints on the surface onto a linear detector array 121 and filters out sunlight spatially and spectrally based on a grating imaging spectrometer design. A high-efficiency, single-photon sensitive mercury-cadmium-telluride (HgCdTe) avalanche photodiode (APD) linear detector array 121 is used to detect the return laser pulses 109 from the surface collected by the receiver (RX) telescope 107B. High lidar efficiency is enabled by the high-performance HgCdTe APD array 121 and proper suppression of the solar photon noise and speckle noise. By distributing footprints across multiple small pixels, the solar background noise and detector dark noise in each pixel are reduced while the detector bandwidth is increased.

In one embodiment, successive footprints on the surface illuminated by the laser beam 132 at a fixed cross-track pointing angle forms a track of footprints in the along-track direction. In one embodiment, the return laser beam 109 from a central footprint at the center wavelength travels along an optical axis from the receiver telescope 107B to the linear detector array 121.

In one embodiment for the lunar-orbiting lidar, the lidar receiver 108 includes RX telescope 107B optics (i.e., primary mirror 110 and secondary mirror 111) which focus collect return photons 109 in return laser beam 109 and images all footprints onto an entrance slit 112 (rather than individual holes) that passes the signal photons and blocks the solar photons (i.e., solar background radiation) spatially. In one embodiment, the entrance slit is disposed between the RX telescope 107B and the receiver grating 116. In one embodiment, footprints on the surface are imaged by the RX telescope 107B onto the entrance slit 112 which is oriented along the cross-track direction to allow images of the footprints to pass while the entrance slit 112 limits the individual field-of-view (iFOV) in an along-track (flight) direction (see directional arrow in receiver 108) to about 160 µrad (about 8 meters (m) on the surface) for the lidar 100. In one embodiment, the cross-track iFOV is limited by the width of two detector pixels (i.e., worst case) to be 163 µrad (8.17 m on the surface). In one embodiment, each detector pixel is 22 µm×22 µm and the 128 m swath is imaged onto 2×34 detector pixels.

In one embodiment, a folding mirror 113 is disposed between the entrance slit 112 and the receiver grating 116 to fold the optical axis by 90° from that of receiver telescope 107B and directs the rays 109 towards the receiver grating 116 whose grooves are disposed parallel to the optical axis of the receiver telescope 107B. In the embodiment, the folded optical axis makes a preferred angle (e.g., 32.10 in one embodiment) to the entrance slit 112 to optimize the receiver 108 performance.

In one embodiment, the solar background radiation is also suppressed spectrally. In one embodiment, the reflected sunlight that passes through the entrance slit 112 is dispersed into a spectrum by the receiver grating 116 and an exit slit 118 disposed between the receiver grating 116 and the linear detector array 121 blocks most of the sunlight spectrum while passing the images of the laser footprints. In one embodiment, before entering the receiver grating 116, the light through the entrance slit 118 is collimated by optics collimating lens 114 disposed between the entrance slit 112 and the receiver grating 116, and is passed through a long pass optical filter 115 disposed between the collimating lens 114 and the receiver grating 116 to reject solar photon below the minimum operation wavelength of the laser transmitter 101 (e.g., below about 1000 nm) from the collimated light from collimated lens 114).

In one embodiment, the laser beam diffracted by the receiver grating 116 is focused by a first focusing lens 117 (or a pair of lenses) disposed between the receiver grating 116 and the exit slit 118, onto the exit slit 118; a second collimating lens 119, disposed between the exit slit and the detector array 121, collimates light passing through the exit slit 118; and a second focusing lens 120, disposed between the second collimating lens 119 and the detector array 121, re-images footprints from the surface passing through the exit slit 118 onto the linear detector array 121. The exit slit 118 passes images of footprints on surfaces while blocking the solar background radiation dispersed by the receiver grating 116. In one embodiment, a small 3.2-cm wide grating 116 (with 1500 lines/mm) can narrow the optical passband to 0.8 nm for return laser beam 109 from all illuminated footprints on the surface (at different wavelengths) narrow enough to suppress solar background noise.

In one embodiment, similar to the TX optics shown in FIG. 3, at least one delivery lens (not shown) may be inserted between the receiver telescope 107B and the collimating lens 114 to image the primary mirror 110 of the receiver telescope 107B aperture onto the receiver grating 116 to minimize the beam wander on the receiver grating 116 to reduce the sizes of the grating 116 and optics around the grating 116.

In one embodiment, another folding mirror (not shown) is inserted between lens 117 and the exit slit 118 to make the layout of the lidar receiver 108 more compact.

In one embodiment, lenses 114 and 117 (before and after the receiver grating 116) are placed as close (proximate) as possible to the receiver grating 116, to reduce beam wander on both the lenses 114, 117, and to reduce the sizes of the lenses. Focusing lens 120 may be a separate lens or combined into a single imaging lens with collimating lens 119.

In one embodiment, each iFOV is imaged onto the detector 121 area of 2×2 pixels and 8.17 footprints fall on each pixel width.

In one embodiment, the high-performance APD array 121 is a HgCdTe APD array 121 which includes sufficient pixels that can enable 3-D wide-swath lidar imaging from space. In one embodiment, the novel APD array 121 may achieve a noiseless APD gain (~1000), 90% quantum efficiency from 0.9 μm to 4.5 μm, single-photon-sensitivity, and fast impulse response (3.5 ns full-width-at-half-maximum (FWHM)). Unlike the single photon counter, each pixel of the linear-mode analog APD detector array 121 can detect multiple photons simultaneously, allowing higher ranging precision and avoiding first photon bias. The APD array 121 of the present invention combines the benefits of single-photon-sensitivity and full waveform digitization.

In one embodiment, the HgCdTe APD array 121 is cooled by a cryocooler (not shown) that has a vacuum window and two cold filters to reject thermally generated photons in the detector's 121 wavelength range.

The present invention also has the advantage of shortening the detector array 121 while reducing solar photon and speckle noise (discussed below). In a standard grating spectrometer, the entrance slit is parallel to the receiver grating 116 grooves so that beams from different footprints have the same classical grating incident angle $\alpha=\alpha_0$ but different angle $\gamma$ to the plane perpendicular to the grating grooves (referred to as "classical incident plane"). The grating equation is given by $\sin \alpha + \sin \beta = \lambda/(d^*\cos \gamma)$, where $\lambda$ is the wavelength, d is the grating groove spacing, $\beta$ is the classical diffracted angle. Since different footprints (with different wavelengths) have different diffracted angle $\beta$, the exit slit is rotated around the optical axis by an angle $\theta_{tilt}$ from the grating grooves. The images of contiguous footprints on the exit slit are also stretched apart, requiring a detector array with a longer length $L_0/\cos(\theta_{tilt})$. Correspondingly, this longer detector array reduces the solar photon rate on each detector pixel to $R_0$.

In the standard grating spectrometer design, the required detector length can be reduced to $L_0$ by inserting an identical grating (not shown) between lenses 119 and 120 to reverse the dispersion of the receiver grating 116, at the expense of an increased solar photon rate $R_0/\cos(\theta_{tilt})$ on each detector pixel.

In one embodiment of the present invention without the folding mirror 113, a groove direction of the receiver grating 116 is rotated at an angle $\theta_1$ from the entrance slit 112 around the optical axis, so that for a footprint with longer wavelength the incident angle $\alpha$ becomes larger by $\Delta\alpha=\alpha-\alpha_0$ and the corresponding diffracted angle $\beta$ is reduced by the same amount $\Delta\alpha$.

In one embodiment, the beams 109 from the central footprint (at the center wavelength $\lambda_0$) travels along the optical axis with $\alpha=\beta=\alpha_0$ and $\gamma=0$ to said grating 116. It can be shown that the angle $\theta_2$ between exit slit 118 and the grating 116 grooves is reduced from $\theta_{tilt}$ to $\theta_2=\text{atan}[\tan(\theta_{tilt})-\sin(\theta_1)]/\cos(\theta_1)$. Correspondingly, the required detector array 121 length is reduced to $L_0 \cos(\theta_1)/\cos(\theta_2)$ and the solar photon rate on each detector 121 pixel is reduced to $R_0/\cos(\theta_1)$.

Thus, angle $\theta_1$ is selected according to one of a following a) to c): a) angle $\theta_1$ is selected such that angle $\theta_2$ becomes identical to angle $\theta_1$ to reduce linear detector array 121 length while reducing solar photon rates on each of the detector pixels; or b) angle $\theta_1$ is selected as greater than angle $\theta_1$ in a) to decrease the linear detector array 121 length compared to the length of the linear detector array 121 in a), while the solar photon rate on each of the detector pixels is increased compared to the solar photon rate in a); or c) angle $\theta_1$ is selected as less than angle $\theta_1$ in a) to decrease the solar photon rate compared to the solar photon rate in a), on each of the detector pixels while the length of the linear detector array 121 is increased compared to the length of the linear detector array 121 in a).

In one embodiment, the folding mirror 113 folds the optical axis by 90° from that of the receiver telescope 107B towards the first receiver grating 116 whose grooves are disposed parallel to the optical axis of the receiver telescope 107B and the angle $\theta_1$ between the grooves of the first receiver grating 116 and an image of the entrance slit 112 mirrored by said folding mirror 113 can be set to a selected value of angle $\theta_1$ by rotating the folding mirror 113 and all downstream optics around the optical axis of the receiver telescope 107B such that the angle between the folded optical axis and the entrance slit 113 is identical to said selected value of $\theta_1$. On the exit slit 118, the sunlight is dispersed into a spectrum perpendicular to the grating 116 grooves along the z direction. The exit slit 118 and the linear detector array 121 are rotated by $\theta_2$ from the grating 116 grooves (z direction) around the optical axis to align with the rotated footprint locus.

The benefits of the present method can be appreciated in an exemplary embodiment for the lunar orbiting lidar where $\theta_{tilt}$ is 470 and $1/\cos(\theta_{tilt})=1.46$. $\theta_1$ is chosen so that $\theta_2=\theta_1=32.1°$ and the images of the contiguous footprints remain contiguous on the exit slit 118 and the detector array 121. This reduces the detector 121 length to $L_0$ (46% shorter than $L_0/\cos(\theta_{tilt})$ in a standard grating spectrometer design) while reducing the solar photon rate on each detector 121 pixel to $1.18R_0$, which is 19% lower compared to $R_0/\cos(\theta_{tilt})=1.46R_0$ achieved by inserting the additional grating in a standard grating spectrometer.

This is not possible in the prior art which uses individually tuned, narrow-band optical filters, such as etalons, for each of the transmit wavelengths. The compact optical filter 115 design of the receiver 108 of the present invention also outperforms standard grating spectrometer design that uses an additional grating to shorten the detector array 121 length.

Lidar Electronics

In one embodiment, time-sequenced beam steering also benefits the receiver 108 design. Since the return pulses for different footprint locations arrive at the detector array 121 at different times, in one embodiment that includes at least one high-speed 1-GHz analog-to-digital converter (ADC) 124 and at least one radio frequency (RF) switch 123 (i.e., time-division multiplexer), where each time division multiplexer 123 can multiplexes up to 10 detector super pixel signals from different tracks of footprints on the surface returned at different times, into one signal to be digitized by one said high-speed ADC 124 for surface ranging.

In one embodiment, the recording time available for each wavelength corresponds to a 1.9 km window which will be centered on the known range to the Earth's surface stored on-board in a global digital elevation model (DEM). In this way, in one embodiment, only three ADCs 124 are needed for 30 footprints, and time division multiplexing reduces the receiver 108 power required for waveform recording compared to an ADC per-profile in a prior art beam-splitting system.

In one embodiment, each footprint track's atmospheric return can be digitized in parallel with an ultralow-power low-speed ADC 124 at a much lower resolution without significantly increasing the power and data volume. In one embodiment, the sequential atmospheric returns are aligned and aggregated spatially to further reduce the data volume. In one embodiment, one of a number (e.g., 30) of low-speed ADCs 125 can sample a signal from a detector super pixel illuminated by one track of the footprints on the surface, to record the atmospheric returns in parallel.

In one embodiment, the time division multiplexing method described above allows atmospheric profiling in addition to surface ranging and mitigates cloud folding (discussed below). As will be apparent, for airless bodies (such as the Moon), returns from all contiguous footprints (e.g., 256 footprints) can be time division multiplexed onto only a few (e.g., two) high-speed ADCs. In one embodiment, an electronic control system 126, based on a high-performance ultra-scale FPGA 127, controls the ADCs, the time-division multiplexers, and the lidar 100 operation. The FPGA 127 processes data, reduces the data volume, and streams the processed raw data to a solid-state data storage 129. In one embodiment, positioning and timing is provided by a global-positioning-system (GPS) 128 outputting a signal at 1 pps to the FPGA/AI 127.

In one embodiment, processed raw data are downloaded to the ground via communication link 131 using communication module 130 for post-processing.

In one embodiment, the FPGA 127 based data processing and commanding can be accommodated with compact SpaceCube electronics.

Features a. Cloud Folding

On each detector 121 "super pixel" (defined below), the return of a laser pulse from cloud-top (as high as 19k m on Earth) can catch up with the surface return of the proceeding laser pulse 109 and mess up the measurement when the laser pulse interval is less than 125 µs (i.e., the pulse rate is higher than 8 kHz). In one embodiment, the present invention can mitigate cloud folding from a cloud top as high as 19 km while allowing multiple laser pulses to be transmitted within each sweep duration as short as 125 µs by repeating a set of interlaced wavelength sweeps to swath-map the surface so that the pulse intervals on each detector 121 "super pixel" are more than 125 µs.

Figure 4:
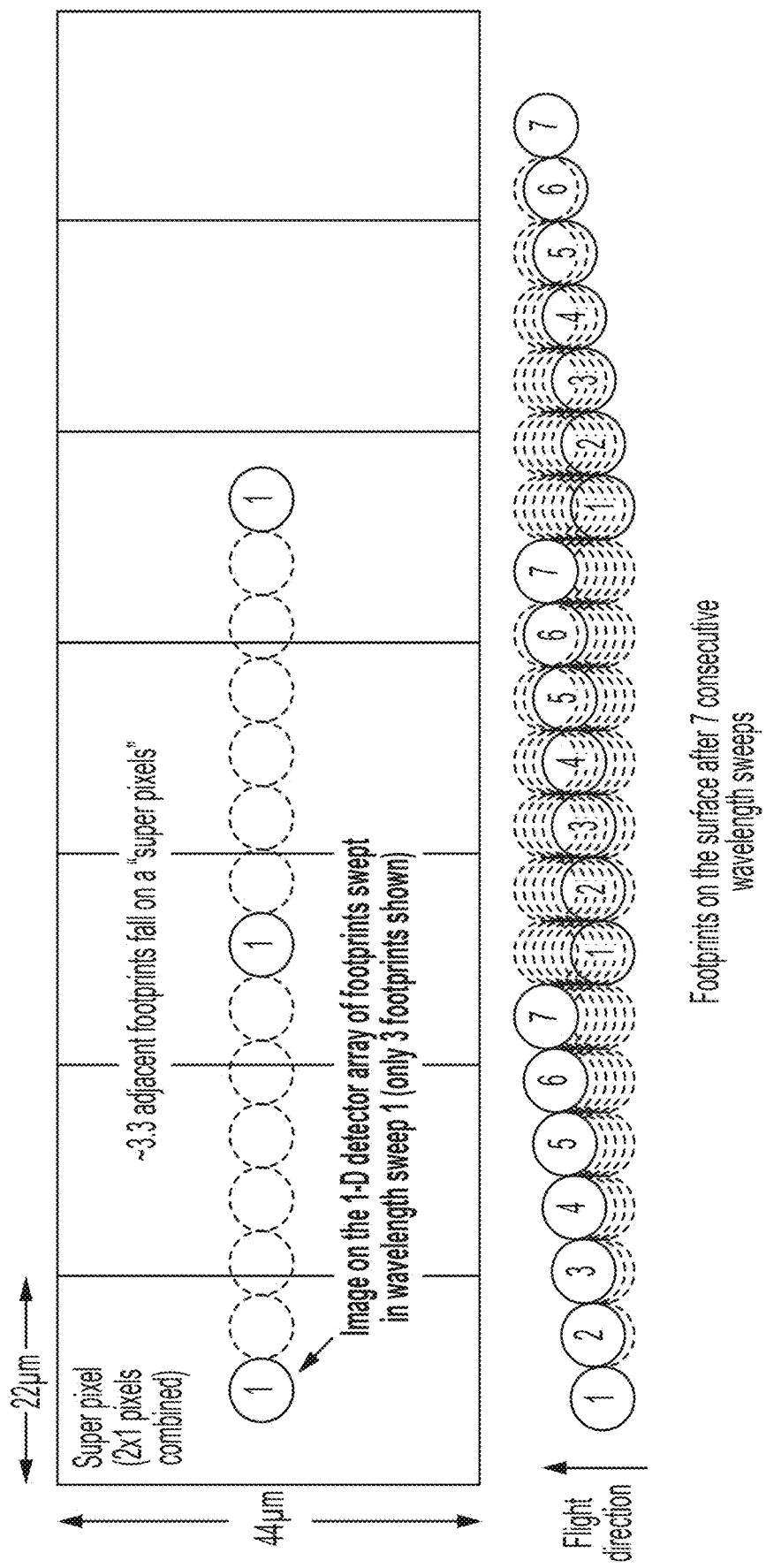
FIG. 4 is a schematic diagram of the image on a linear detector array, according to one embodiment consistent with the present invention, and the footprints swept in a wavelength sweep, and the footprints on the surface after seven consecutive wavelength sweeps.

In one embodiment, two detector pixels (22 µm×22 µm each) in a column are combined into one "super pixel" (see FIG. 4). Each "super pixel" can be read out individually. In a typical design, ~3.3 adjacent footprints are imaged onto a "super pixel". FIG. 4 shows a schematic image on a linear detector array, and the footprints swept in wavelength sweep one (only three footprints shown), and the footprints on the surface after seven consecutive wavelength sweeps.

In one embodiment, each footprint can be fully intercepted (and detected) by two adjacent "super pixels" (without spill-over), providing 40 m×40 m iFOV on the surface to accommodate any pointing error.

In one exemplary embodiment, footprints in each sweep are separated by "m" (e.g., 7) resolvable spots (center to center) so that each "super pixel" is illumined by at most one footprint in each sweep (sweep rate <8 kHz) to mitigate cloud folding.

In one embodiment, in m=7 consecutive sweeps, the footprints illuminated in a wavelength sweep are imaged onto different super pixels of the linear detector array 121 and are shifted successively by one footprint FWHM (by slightly shifting the wavelength points) in a following sweep, forming adjacent tracks to form gapless 3D imaging. Such m=7 sweeps are repeated to form 2-D gapless footprints on the surface. The effective pulse repetition rate for each track is 1/7 of the sweep rate (<8/7 kHz). Although each "super pixel" is shared by different tracks, where successive sweeps are separated by more than 125 µs, the intervals of consecutive pulses on each super pixel of the linear detector array 121 are more than 125 µs (i.e., no cloud folding). This interlacing also allows the 2-D footprints to be distributed more uniformly along both flight and cross-track directions, without any gaps.

With respect to airless bodies (e.g., the Moon) that do not have cloud folding anymore, in one embodiment, the pulse interval can be as short as 100 ns (to resolve 15 m height variation). The interlaced sweeps described above is no longer necessary.

In one embodiment, adjacent footprints can be swept consecutively (gapless) by monotonic wavelength tuning in each sweep, as fast as 5000 wavelength points per mesc. In one embodiment, 2-D gapless footprints on the surface are formed by repeating such monotonic sweeps.

In one embodiment, the pulse rate for each track is the same as the wavelength sweep rate. In one embodiment, the pulse interval on each "super pixel" is the tuning interval from one wavelength to the next.

In one embodiment, a burst of pulses (e.g., eight pulses) can be transmitted at each wavelength before moving to the next wavelength. The burst of pulses is essentially probing the same footprint, reducing range variance due to surface height variations along the track.

In one embodiment, the pulse interval in the burst needs only to be long enough to resolve the surface height variation within the footprint (e.g., 100 ns to resolve 15 m height variation).

b. Switched Fabric to Minimize Digitizers

In one embodiment, a switched fabric network 502 (see FIG. 5) in a readout integrated circuit (ROIC) 500 is used to dynamically route detector 121 outputs to reduce the number of output signals to save power by reducing the number of ADCs 124 and the thermal loading on the detector 121 cryocooler.

In one embodiment, an "m" by "n" pixel detector chip is bonded on top of an "m" by "n" transimpedance amplifier (TIA) array, and TIAs in each column of "m" pixels are combined with a summer into a single signal for each super pixel. In an exemplary embodiment, a 2×320 detector chip 501 is bonded on top of a 2×320 transimpedance amplifier (TIA) array. In the integrated circuit (IC), two TIAs in each column are combined with a summer into a single signal for each "super pixel".

Two exemplary types of switch fabrics of the present invention are described here. The first type allows atmospheric profiling and cloud folding avoidance. The second type is for surface ranging of airless bodies.

1. Atmospheric Profiling and Cloud Folding Mitigation

In one embodiment, the ROIC 500 of the linear detector array 121 includes an "n" to "$2n_{track}$" RF switch fabric which is dynamically configured to connect "$2n_{track}$" out of "n" switch inputs selected arbitrarily to "$2n_{track}$" switch outputs, to reduce a number of ROIC output signals. The "n" switch inputs are connected to outputs of "n" super pixels such that the RF switch fabric brings out signals from "$2n_{track}$" super pixels arbitrarily illuminated by "$n_{track}$" footprints on the surface. The switch fabric is controlled by the FPGA 127 and reconfigured when surface footprint locations are changed dynamically.

In one exemplary embodiment, "n" is configured to be 320 and "$2n_{track}$" is configured to be 60 for 30 tracks of footprints. This 320-to-60 RF switch fabric can be used to dynamically select 60 out of the 320 super pixel output signals and route them to 60 output pads, without losing access to any of the sequential detector signals. The RF switch fabric enables arbitrary and dynamic routing configuration without rewiring, and only the illuminated tracks need to be routed out. This also reduces the number of wires going through the vacuum Dewar that cools the detector array 121, to reduce thermal load.

In one embodiment, the number of high-speed ADCs 124 can be further reduced by using 10-to-1 time-division multiplexers 123 outside the detector Dewar as described earlier. This time division multiplexing cannot be done by the switch fabric inside the Dewar because signals from each illuminated track need to go out of the Dewar to be constantly digitized by slow ADCs 125 for atmospheric profiling.

2. Surface Ranging of Airless Bodies

In one exemplary embodiment of a switch fabric for surface ranging of airless bodies, a single laser beam 132 is scanned across track to sequentially illuminate contiguous footprints in a swath, enabling high resolution push-broom gapless 3-D imaging.

In one embodiment, the RF switch fabric in the ROIC of the linear detector array 121 is modified to track the laser beam 132 with no more than four switch outputs. The outputs of the modified RF switch fabric are dynamically connected to a group of contiguous super pixels onto which a moving laser footprint is imaged, to be digitized by fewer (e.g., two) high speed ADCs 124. In one embodiment, for 3-D imaging with monotonic wavelength tuning, said group contains only two super pixels to image said footprint, and a number of ROIC outputs is reduced to two.

Figure 5:
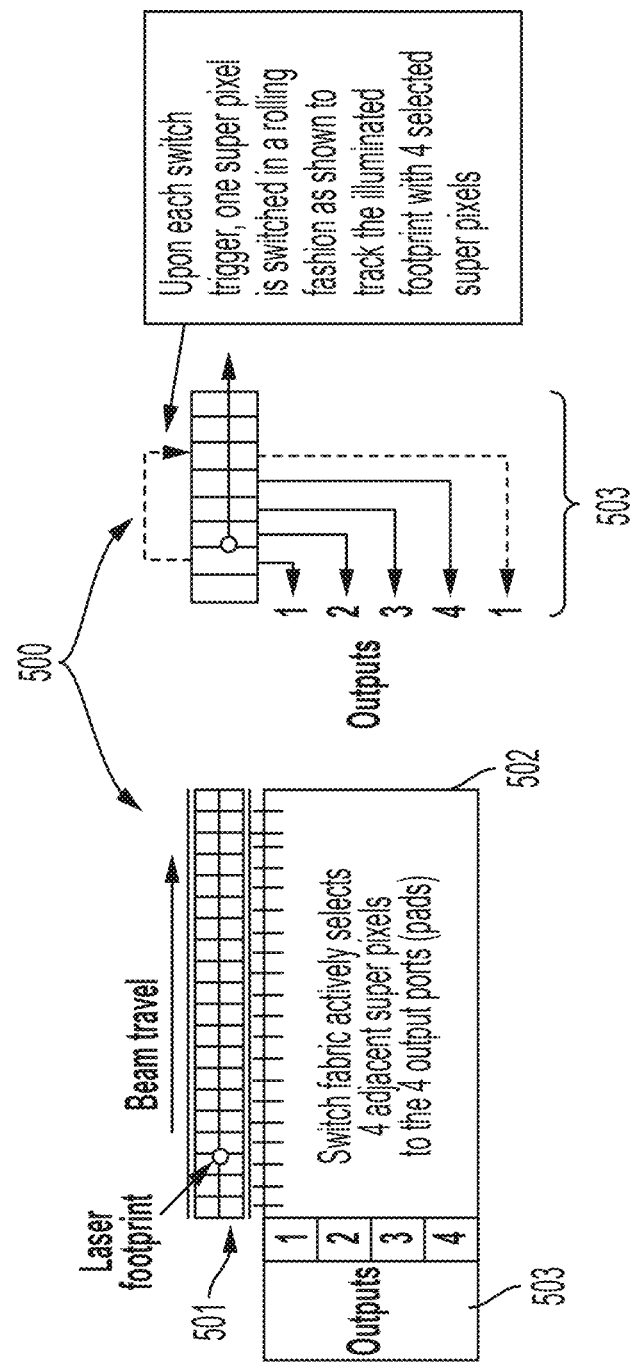
FIG. 5 is a schematic diagram of a switched fabric network in a readout integrated circuit (ROIC) which is used to dynamically route detector outputs to reduce the number of output signals, according to one embodiment consistent with the present invention.

In practice, in one exemplary embodiment (see FIG. 5), a group of four adjacent "super pixels" can be dynamically selected for output to four output ports (pads) 503 in a rolling fashion, to track the illuminated footprint with four selected "super pixels", to reduce the switching speed and to provide margin for optical misalignment and laser wavelength drift. In one embodiment upon each switch trigger from said FPGA, on condition that a laser footprint image moves out a trailing super pixel in the group, a switch output connected to the trailing super pixel is rapidly switched to a super pixel ahead of and adjacent to a leading super pixel of the group to track the moving laser footprint image in a rolling fashion as shown in FIG. 5, while other switch outputs remain connected to other "super pixels" in the group to track the illuminated footprint. In this way, the receiver 108 power required for waveform recording can be reduced significantly compared to a prior art beam-splitting system with a digitizer for each "super pixel".

In one embodiment, the modified RF switch fabric treats the "n" "super pixels" as a circular ring. The modified RF switch fabric wraps around to the beginning of the "n" "super pixels" array when reaching an end of the super pixel array.

In one embodiment, the recording time available for each footprint corresponds to about a 100 m window which is centered on the known range of the surface stored on-board in a global digital elevation model (DEM), or available from the measured ranges of prior shots.

c. Speckle Noise Reduction

In one advantage, the present invention provides for speckle noise reduction. Speckle noise arises from coherent interference of optical waves scattered by a rough surface, resulting in intensity scintillation on the RX telescope 107B. The speckle noise contribution to the ranging variance is inversely proportional to $M_{sp}*M_t$, where $M_{sp}$ is the number of spatial speckles falling the TX telescope 107A, and $M_t$ is the number of laser coherent time intervals within a pulse duration.

Unlike previous space-flown lidars, the small laser footprint of the present invention, and small transmitter telescope aperture lead to a very small $M_{sp}$ (e.g., only 4.4). If the laser linewidth was not broadened (to increase $M_t$), the speckle noise would be overwhelming, diminishing the signal-to-noise improvement normally obtained by shooting stronger pulses.

In one embodiment, the present invention broadens the transmitter laser linewidth to increase a number of coherent intervals $M_t$ within said laser pulse duration to more than 10 to reduce a ranging variance from speckle noise by a factor of $M_t$, so that the speckle noise is no longer a bottleneck. Thus, the laser linewidth may be broadened less than 40% of the frequency spacing of resolvable footprints so that each footprint is broadened less than 8%. This 8% footprint broadening may be canceled by enlarging the beam waist of the laser beam transmitted to the surface by 8% to reduce laser beam divergence while maintaining an unchanged angular separation between adjacent footprints.

In one embodiment of the present invention, when speckle noise is reduced, weaker pulses are combined into a single stronger laser pulse, and size of the collimated beam to the receiver grating 116 is reduced without increasing relative range variance contributions from the speckle noise and solar background noise as compared to range variance contributions from unreduced speckle noise and solar background noise when the collimated beam to the receiver grating 116 is unreduced in size. Thus, in one embodiment, shooting a single stronger pulse instead of four weaker pulses on each footprint overcomes solar photon noise and detector 121 dark noise and relaxes the requirements on the solar background filtering, allows the size of the collimated beam to the receiver grating 116 to be reduced by 2× from 40 mm to 20 mm. As a result, the receiver grating 116 size is reduced by 2 times and the diameter of the associated lenses is also reduced by 2× to 25 mm (for a 20 mm beam).

In one embodiment, an optical frequency spacing of the resolvable footprints is as high as 12.5 GHz to allow the laser linewidth broadening for speckle noise reduction without super-linearly increasing the solar photon rate on each of the detector pixels. In one embodiment, the laser linewidth of the 2 ns pulses is broadened to 3.8 GHz, increasing $M_t$ to 11 and reducing speckle noise variance by 11 times; although 3.8 GHz is 30% of the 12.5 GHz frequency spacing, the laser footprint diameter is only broadened by 5% and is restored by a 5% increase of the transmitter aperture. This is because the convolution of two Gaussian functions (with FWHM1 and FWHM2) is a Gaussian function with $FWHM^2=FWHM1^2+FWHM2^2$. The linewidth can be broadened by the nonlinear effects (mostly self-phase modulation) in the YDFA 103 (and the delivery fiber), making the YDFAs 103 easier to build.

Thus, the present invention allows using smaller-core (e.g., 16 μm) YDFAs 103 that are more efficient, inexpensive and commercially available. Although increasing the frequency spacing beyond 12.5 GHz could allow more linewidth broadening to suppress speckle noise, it would rapidly increase $1/\cos(\theta_{tilt})$—hence the solar photon rate on each pixel—and is thus, undesirable.

d. Correction of "Smile" on Linear Detector Array

The image of ground footprints on the detector array is not a straight line, but a curved "smile" line. This can be explained by the grating equation: $\sin\alpha+\sin\beta=\lambda/(d^*\cos\gamma)$. When a footprint subtends a larger γ, β increases super linearly with $1/\cos\gamma$.

For example, for the Earth orbiting lidar that steers the laser beam across 1100 resolvable tracks, the "smile" is significant and needs to be flatten to a straight line for the linear detector array 121. For the lunar orbiting lidar that only scans 256 resolvable tracks, the "smile" is negligible and does not need to be corrected.

The present invention encompasses two ways to correct the "smile".

Figure 6:
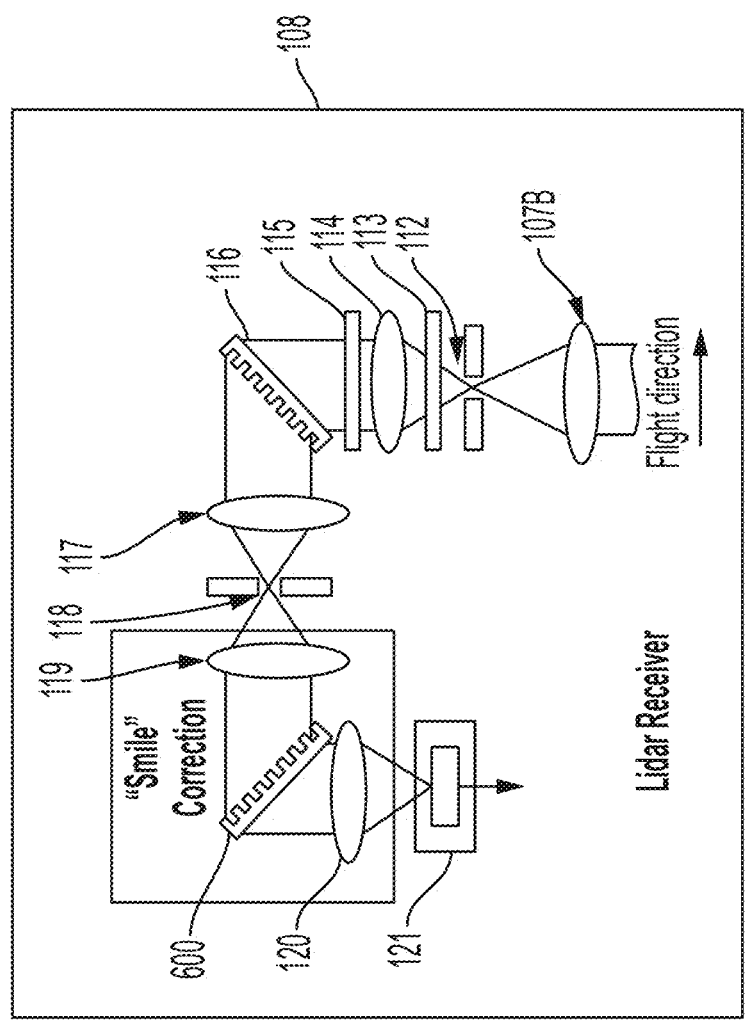
FIG. 6 is a schematic diagram of receiver optics using an additional grating to correct the smile in the locus of footprint images on the linear detector array, according to one embodiment consistent with the present invention.

In one exemplary embodiment, the "smile" can be corrected by inserting between two lenses—focusing lens 120 and collimating lens 119 another grating 600 (see FIG. 6) identical to the receiver grating 116 and making lenses 120 and 119 identical such that the two identical gratings 116 and 600 and two identical lenses 120 and 119 are oriented in mirror symmetry about the exit slit 118. In one embodiment, the exit slit 118 is curved to match a curved locus of images of the footprints on the exit slit 118, to allow the "smile" images of the footprints to pass through. In another embodiment where an additional grating is inserted in the transmitter to correct for the smile, the entrance slit 112 is curved to match a curved locus of the images of the footprints on the entrance slit.

In one embodiment, the diffracted angle β of the second grating 600 is the same as the incident angle α of the first grating 116, and thus, is constant (smile flattened) making a locus of footprint images on the detector array 121 a straight line. This is because the incident angle α of the second grating 600 is the same as the diffracted angle β of the first grating 116 and (apart from a sign flip) the angle γ is the same for both gratings 600, 116 (due to the mirror symmetry).

In another exemplary embodiment to correct the "smile", a 2000-track landing lidar is used as an example. In this embodiment, the "smile" can also be corrected by pre-distorting the footprints trajectory on the surface with an additional grating (not shown) in the transmitter 101 that has the identical groove density as the receiver grating 116. In effect, the additional (second) transmitter grating is oriented in mirror symmetry to the receiver grating 116 so that the diffracted angle β of the second transmitter grating equals to the incident angle α for the receiver grating 116 and (apart from a sign flip) the angle γ is the same for both the second transmitter grating and the first receiver grating 116. This can be achieved by placing the second transmitter grating after the transmission telescope 107A when the diameter of the beam 109 entering the receiver grating 116 remains the same as aperture diameter of the receiver telescope 107B (i.e., unity magnification). Again, the diffracted angle β of the receiver grating 116 is the same as the incident angle α of the second transmitter grating, and thus, is constant (smile flattened).

More generally, the received beam 109 is reduced by a factor M at the receiver grating 116. To correct the "smile", the transmitted beam size needs to be larger than the beam size at the second transmitter grating by the same factor M.

In one embodiment, for the earth orbiting lidar 100 of the present invention, for example, the receiver telescope 107B and aft optics including the relay lens and the first collimating lens 114 reduces the 0.4-m beam diameter by 10× (to 40 mm) at the receiver grating 116. In one embodiment, the transmitted beam size (i.e., 78 mm diam. @$1/e^2$) is 4× of that at the first transmitter grating 106. In this embodiment, the second transmitter grating can be inserted between the first transmitter grating 106 and the telescope 107A, and the beam 132 out of the first transmitter grating 106 needs to be reduced by 4/10 at the first receiver grating 116. The beam 109 exiting the second transmitter grating is expanded by 10× and then transmitted.

d. Pseudorandom Pulse Position Modulation

In one embodiment, the present invention adopts pseudo-random pulse position modulation (PRPPM) to resolve unwanted range ambiguity. In this embodiment, the intervals of "n" consecutive pulses for each track are shifted from a constant (average) pulse repetition period by a small pseudo-randomly offset. The PRPPM pattern of the "n" consecutive pulses is repeated and the range ambiguity within the length of "n" consecutive pulses can be resolved.

In one embodiment, different tracks can use (different) orthogonal PRPPM codes to suppress optical interference among them. Unlike the traditional pseudo-random noise (PN) code lidar, the PRPPM pulse interval of the present invention is nearly constant (a constant plus a small pseudorandom offset), which is more friendly to fiber lasers.

In contrast, the traditional PN code lidar throws away one half of the pulses (50% 0s) and the pulse intervals vary greatly (long runs of 0s or 1s).

In one embodiment, the PRPPM lidar retains the benefits of traditional PN code lidar (range unambiguity and interference suppression), while maintaining a nearly constant pulse rate (close to a periodically pulsed lidar).

When the minimum pulse interval is limited (e.g., by the wavelength switching time ~200 ns for existing lidars), PRPPM, as used in the present invention, nearly doubles the allowed average pulse rate compared to the traditional PN code. This is desirable for landing lidars that requires very high scanning rate (4M pixels/sec).

E. Velocity Measurement Capability

The present invention also enables unprecedented landing/docking lidar capabilities, allowing one lidar to perform all three required measurements—i.e., 1) long-range ranging and 2) velocity measurements at a few footprints, and 3) close-range 3-D imaging with 2k×2k pixels within each second. In one embodiment, the approaching speed of the spacecraft to the surface can be measured from the range rate measured with pulsed TOF lidar using direct detection. In comparison, measuring velocity from the optical Doppler effect using a coherent lidar suffers strong speckle noise for rough surfaces ($M_{sp}*M_t=1$).

f. 3-D Imaging Lidar Capability for Spacecraft Landing/Docking

In general, the 2-D footprint pattern is formed while the linear footprints travel with the spacecraft. For landing/docking lidars, however, the spacecraft does not move fast enough laterally. In the latter case, a slow 2-D steering mirror (not shown) can mechanically scan the transmitted beam and receiver FOV simultaneously (up to tens of Hz) while the laser beam is also rapidly steered by wavelength, mimicking the spacecraft movement along the track and extend the cross-track swath for 3D imaging.

In one exemplary embodiment, a 3-D lunar landing lidar is used. In the exemplary embodiment, the lidar needs to measure a gapless 3-D image of the lunar surface within 1 sec from a 1-km distance at a 5-cm spatial resolution and 1.6 cm range precision (1σ) over an area of 100 m diameter. These stringent requirements cannot be met with a mechanical scanner alone. However, in the present invention, these stringent requirements can be met by combining fast wavelength steering and slow 2-D mechanical scanning and the required scanner bandwidth and acceleration for the mechanical scanner are greatly reduced, to save its power consumption and increase its reliability.

In one embodiment, a 2-D mechanical steering mirror is used to scan both the transmitter beam 132 and the receiver FOV in an 8-pass rolling pattern 706 at 4 Hz (see FIG. 7) while the transmitter laser beam 132 is rapidly swept by wavelength across 250 contiguous footprints 702 (separated by 5 cm FWHM) as described above. In one embodiment, the receiver 108 images the 250 contiguous footprints 702 on a linear detector array 121. In one embodiment, the 250 footprints 702 on the surface form a gapless "broom" 702, which is pushed by the 2-D scanner to produce the required gapless image over the 100-m diameter area 705. In one embodiment, the 2-D scan starts from left and rolls to the right, and then rolls back to left.

However, the wavelength tuning rate is a bottleneck, limited to below 5M wavelengths/sec. The scanner bandwidth, speed and acceleration are also limited, so it is desirable to allow more time for the scanner to flip along-track sweep direction and to move cross-track to the next pass. It is noted that the inventors found it beneficial to use this along-track sweep direction reversal duration for 3-D mapping of the area 705 to avoid demanding shorter wavelength switching time in the rest of the 1 sec period.

In this exemplary embodiment, the duration of along-track speed reversal 713 is increased to 28% of a full along-track sweep duration, reducing the peak acceleration to only 42.5 Rad/sec$^2$ and peak speed to 57°/sec for the 2-D steering mirror. In the exemplary embodiment, since the along-track speed reversal duration contributes to the 3-D mapping, the peak wavelength stepping rate is only increased by 11% to 4.4 MHz/sec to make up the slow down during the along-track speed reversal. In the exemplary embodiment, the peak acceleration cross-track is reduced to the same as along track direction by ramping 715 in cross-track direction to the next pass in longer times than the duration of along-track speed reversal 713. Since this reduces the dwell time on each pass, the passes are no longer straight and small corners of the 100 m×100 m area 704 are no longer covered. Nevertheless, in the present exemplary embodiment, the 100 m diameter area 705 is more than fully covered with a scanned area 706.

In one embodiment of the present invention, sharp corners in the angle vs. time curves 710 for both along track 712 and cross-track 714 are rounded, and the angular velocity and acceleration are made continuous, to minimize the required bandwidth and peak angular acceleration and speed. In the along-track (y) direction, the scanning direction is flipped quickly following curve 713, to reduce the peak laser stepping rate. This also reduces wasteful footprint overlapping during the direction flipping. In the cross-track (x) direction, the steering mirror ramps to the next pass quickly (following curve 715) while direction flipping in the along-track direction. This allows more dwell-time on a constant cross track angle for each pass to keep each pass as straight as possible, to cover more area at corners.

In this embodiment, the angle vs. time curve 710 in the along-track direction is a triangle wave with each corner replaced by a half period of sine function 713. The linear sections account for 72% of the 1 sec frame time. In the embodiment, for cross-track direction, the 2-D steering mirror ramps the beam pointing angle among eight fixed angles evenly spaced by ⅛ of a full cross-track angular range and the gapless broom spans at least said cross-track angular spacing. The cross-track pointing angle rolls from the smallest to the largest of the eight fixed angles by repeating a rolling cycle.

In one embodiment, at the start of the rolling cycle, the cross-track pointing angle dwells on a fixed angle while the along-track pointing angle is swept linearly in an initial direction, and then ramps forward by ½ of the full cross-track angular range to the next fixed angle while the along-track pointing angle sweep is reversed. The cross-track pointing angle dwells on the next cross-track fixed angle while the along-track pointing angle is swept linearly in reversed direction, and subsequently ramps back by ⅜ of the full cross-track range to a following fixed angle while the along-track pointing angle sweep is reversed to the initial direction, ending the rolling cycle.

In one embodiment, the cross-track pointing angle rolls back from the largest to the smallest of the eight fixed angles by repeating the rolling cycle in reversed cross-track ramping direction and reversed along-track sweeping direction, starting as the cross-track pointing angle dwells on the largest of the eight fixed angles while the along-track pointing angle is swept linearly in the reversed direction.

In the embodiment, the angle ramps from one fixed angle to the next one (for the next pass) in the curve 715 composed of a linear ramp plus one period of sine function. In the embodiment, the angular speed and acceleration are made continuous at the joints between linear sections and the connecting curves.

In one embodiment of the present invention, the 1-D "broom" swept by wavelength is more than 250 contiguous footprints (e.g., 256) 702 to allow "broom" overlap between adjacent passes to avoid 3-D imaging gaps arising from pointing jitters.

In one embodiment, although the entire 100 m×100 m area can be covered by straight sections of the passes of a raster scan, the required laser wavelength stepping rate, the mechanical scanning bandwidth and acceleration are much higher than those for the present invention. Although an 8-pass raster scan moves only ⅛ of the full angular range along cross-track direction at a time, the curved sections of scan passes leave gaps between adjacent passes and thus not suitable for the gasless 3-D imaging.

Figure 7:
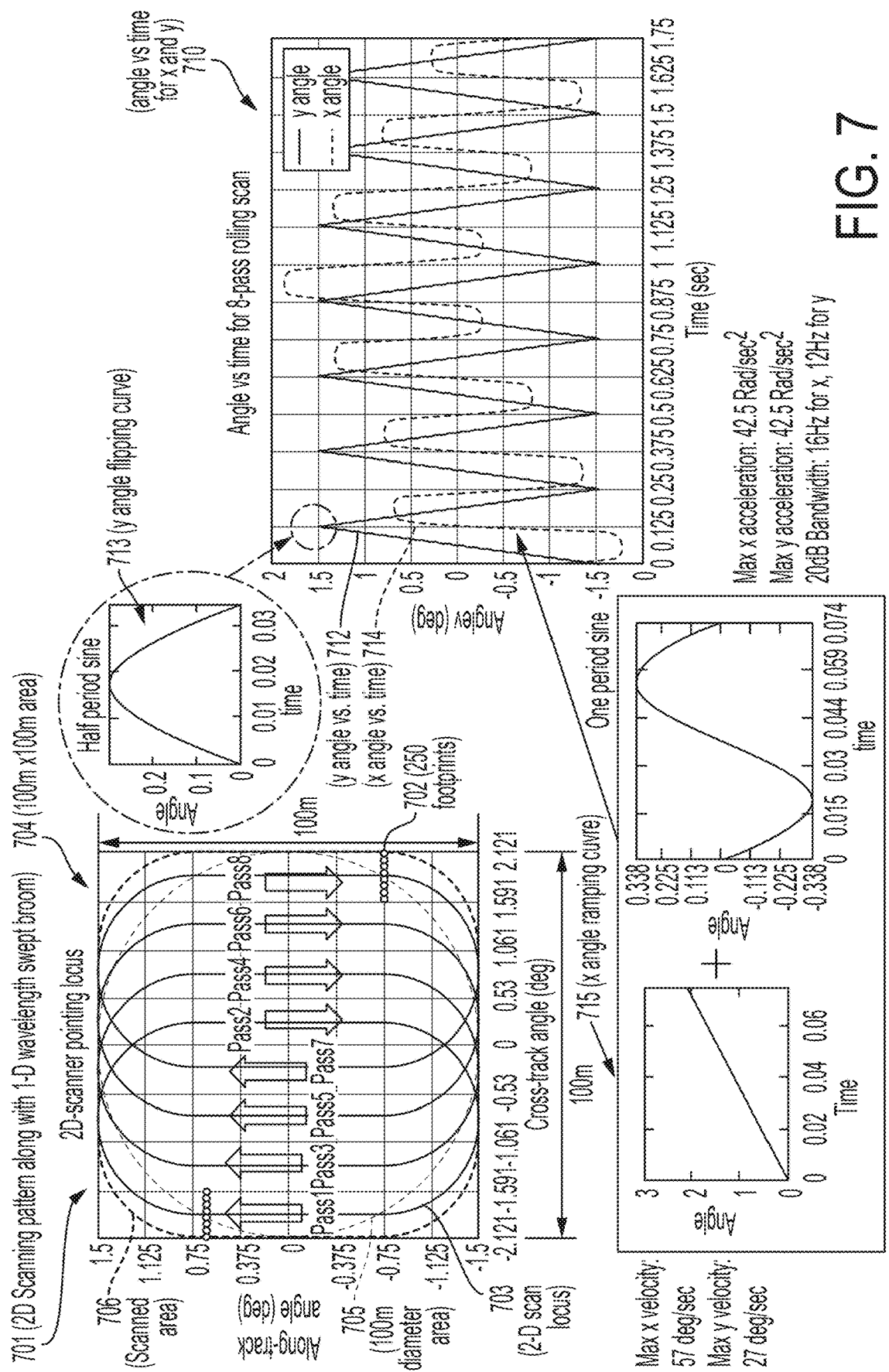
FIG. 7 is a graph showing a 2D mechanical scanning pattern in conjunction with 1-D fast wavelength steering for gapless 3-D imaging of a 100 m diameter surface area, according to one embodiment consistent with the present invention.

In one embodiment of the present invention, such gaps are eliminated while minimizing wasteful footprint overlapping by adopting the rolling pattern in FIG. 7. The progressive rolling cycle is repetitive so that the required bandwidth and the peak angular acceleration of the scanner are reduced compared to spiral scanning patterns that also allow gapless 3-D imaging.

In other embodiments of the present invention, the rolling pattern is generalized to other even number "2n" of passes (e.g., 4, 6, or 10) where the "broom" covers a cross track range slightly longer than 1/2n of full cross-track range, and the 2D steering mirror rolls forward by one half of the full cross-track range and then rolls back (n−1)/2n of the fill cross-track range in a similar progressive rolling fashion.

APPLICATIONS

In one embodiment, lidar system of the present invention may be configured to perform multiple lidar functions including:
a) 3-D imaging of a surface with up to 2000×2000 pixels in a close range more than 1 km;
b) range measurements at a long distance—i.e., more than 100 km—by concentrating laser power on a few footprints; or
c) velocity measurements derived from a range rate of varying ranges measured from the time of flight (TOF) of the laser pulses.

Some other applications of the present lidar system include, but are not limited to:
1. geology surveys;
2. landing images;
3. navigation landing;
4. satellite service/docking 3-D imaging.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A lidar system comprising:
a laser transmitter system; and
a receiver system;
wherein said laser transmitter system includes:
a seed laser system including a wavelength-tunable seed laser about a center wavelength which emits laser pulses of a laser beam at selected wavelength points, and switches from one wavelength to another wavelength within a switching time of less than 200 ns;
a fiber amplifier which amplifies said laser pulses up to 200 kW and collimates said laser beam;
a first transmitter grating which receives said laser beam from said fiber amplifier;
a transmitter telescope, including a primary mirror and a secondary mirror; and
a pair of relay lenses or mirrors;
wherein said laser beam is directed from said first transmitter grating via said pair of relay lenses or mirrors, to said secondary mirror and then to said primary mirror, to image said first transmitter grating on said primary mirror, in order to minimize laser beam wander on said primary mirror; and
wherein said first transmitter grating diffracts and steers said collimated laser beam from said fiber amplifier by wavelength via said primary mirror to a surface, to an arbitrary subset of up to 2000 resolvable footprints along a cross-track direction on said surface at a beam pointing angle switching time of less than 200 ns, such that said footprints which are illuminated by said laser beam from said first transmitter grating on to said surface are imaged in three-dimensions (3D), wherein said center wavelength of said laser transmitter system and a receiver wavelength of said receiver system are centered about any laser wavelength including one of a 1035 nm, a 1550 nm, a 2050 nm, or a 518 nm wavelength:
wherein said receiver system comprises:
a receiver telescope including a primary mirror and a secondary mirror, said receiver telescope which collects return laser pulses of said laser beam returning from said surface;
a first receiver grating which filters out solar background radiation spatially and spectrally for all said footprints illuminated by said laser beam returning from said surface with different wavelengths; and
a linear detector array on which said footprints from said surface are imaged;
wherein said return laser beam from a central footprint of said footprints, at said center wavelength, travels along an optical axis from said receiver telescope to said linear detector array; and
wherein said footprints are distributed across multiple of detector pixels, such that a solar background noise and a detector dark-noise on each pixel of said linear detector array are decreased while a bandwidth of said linear detector array is increased; and
wherein said receiver system further comprises:
an entrance slit disposed between said receiver telescope and said first receiver grating;
wherein said footprints on said surface are imaged by said receiver telescope onto said entrance slit which is oriented along said cross-track direction to allow images of said footprints to pass while limiting a receiver individual field of view (iFOV) of each of said footprints in an along-track direction;

wherein successive footprints on said surface illuminated by said laser beam at a fixed cross-track pointing angle forms a track of footprints in said along-track direction; and wherein said receiver iFOV of each of said footprints in said cross-track direction is limited by a width of no more than two detector pixels.

2. The lidar of claim 1, wherein said receiver system further comprises:

an exit slit disposed between said first receiver grating and said linear detector array;

wherein a groove direction of said first receiver grating is rotated by an angle $\theta_1$ from said entrance slit around said optical axis such that a relatively longer wavelength of one of said footprints corresponds to a relatively larger incident angle to said first receiver grating;

wherein said exit slit and said linear detector array are rotated by an angle $\theta_2$ from said groove direction of said first receiver grating around said optical axis to align with said images of said footprints; and wherein said angle $\theta_1$ is selected according to one of a following a) to c):

a) wherein said angle $\theta_1$ is selected such that said angle $\theta_2$ becomes identical to said angle $\theta_1$ to reduce a length of said linear detector array while reducing a solar photon rate on each of said detector pixels; or b) wherein said angle $\theta_1$ is selected as greater than said angle $\theta_1$ in a) to decrease said length of said linear detector array as compared to said length of said linear detector array in a), while said solar photon rate on each of said detector pixels is increased compared to said solar photon rate in a); or c) wherein said angle $\theta_1$ is selected as less than said angle $\theta_1$ in a) to decrease said solar photon rate as compared to said solar photon rate in a), on each of said detector pixels while said length of said linear detector array is increased as compared to said length of said linear detector array in a).

3. The lidar system of claim 2, wherein said receiver system further comprises:

a first collimating lens disposed between said entrance slit and said first receiver grating;

a delivery lens disposed between said receiver telescope and said first collimating lens configured to image said primary mirror of said receiver telescope onto said first receiver grating, to minimize beam wander on said first receiver grating;

an optical filter disposed between said first collimating lens and said receiver grating, which rejects solar photons below a minimum operating wavelength of said laser transmitter system from collimated light from said first collimated lens;

a first focusing lens disposed between said first receiver grating and said exit slit, which focuses said return laser beam diffracted by said first receiver grating, onto said exit slit, which allows images of said footprints on said surface to pass while blocking said solar background radiation dispersed by said first receiver grating;

a second collimating lens disposed between said exit slit and said linear detector array; and a second focusing lens disposed between said second collimating lens and said linear detector array, said second focusing lens which re-images said footprints passing through said exit slit and said second collimating lens onto said linear detector array;

wherein said first collimating lens and said first focusing lens are disposed proximate to said first receiver grating to reduce beam wander on both said first collimating lens and said first focusing lens; and wherein said second focusing lens is one of a separate lens or combined into a single imaging lens with said second collimating lens.

4. The lidar system of claim 3, wherein said receiver system further comprises:

a folding-mirror disposed between said entrance slit and said first receiver grating, which folds said optical axis by 90° from that of said receiver telescope towards said first receiver grating whose grooves are disposed parallel to said optical axis of said receiver telescope;

wherein said angle $\theta_1$ between said grooves of said first receiver grating and an image of said entrance slit mirrored by said folding mirror is set to a value of said angle $\theta_1$ by rotating said folding mirror and all downstream optics around said optical axis of said receiver telescope such that an angle between said folded optical axis- and said entrance slit is identical to said selected value of $\theta_1$.

5. The lidar system of claim 4, wherein a laser linewidth of said laser transmitter system is broadened to increase a number of coherent intervals $M_t$ within a laser pulse duration to more than 10 coherent intervals to reduce a ranging variance from a speckle noise by a factor of $M_t$;

wherein an optical frequency spacing of said resolvable footprints as high as 12.5 GHz allows said laser linewidth broadening for speckle noise reduction without super-linearly increasing said solar photon rate on each of said detector pixels; and wherein on condition that said speckle noise is reduced, a plurality of relatively weaker laser pulses is combined into a single relatively stronger laser pulse and a size of said collimated beam to said first receiver grating is reduced without increasing relative range variance contributions from said speckle noise and said solar background noise, as compared to said relative range variance contributions from unreduced speckle noise and said solar background noise when said collimated beam to said first receiver grating is unreduced in size.

6. The lidar system of claim 5, wherein a broadening of said footprints due to said laser linewidth broadening is canceled by enlarging said laser beam transmitted to said surface, to reduce laser beam divergence while maintaining an unchanged angular separation between adjacent of said footprints.

7. The lidar system of claim 6, wherein one of said entrance slit or said exit slit is curved to match a curved locus of said images of said footprints on respective of said entrance slit or said exit slit.

8. The lidar system of claim 7, wherein said receiver system further comprises:

a second receiver grating disposed between said second collimating lens and said second focusing lens to correct for a smile on said linear detector array;

wherein said first receiver grating and said second receiver grating are identical, and said second collimating lens and said first focusing lens are identical; and wherein said first and second receiver gratings and said first focusing lens and said second collimating lens are in mirror symmetry about said exit slit such that an incident angle of said second receiver grating is identical to a diffracted angle of said first receiver grating, making a locus of footprint images on said detector array a straight line.

9. The lidar system of claim 8, further comprising:
a plurality of electronics, said plurality of electronics including:
at least one relatively high-speed analog-to-digital converter (ADC);
a plurality of relatively low-speed ADCs, one of said ADCs which samples a signal of a detector super pixel illuminated by one of a track of footprints on said surface, to record atmospheric returns in parallel;
at least one time-division multiplexer each of which multiplexes up to 10 detector super pixel signals from different tracks of footprints on said surface returned at different times, into one signal to be digitized by one of said relatively high-speed ADCs for surface ranging; and
a field-programmable gate array (FPGA) processor which controls said relatively high-speed ADC and said relatively low-speed ADCs, said at least one time-division multiplexer, and lidar system operation.

10. The lidar system of claim 9, wherein said seed laser system comprises:
an optical Mach-Zehnder modulator (MZM) which synchronously carves an output of said seed laser amplified by a seed laser fiber amplifier, into laser pulses of a minimum of 2 ns at selected wavelengths;
a MZM bias controller;
at least dine digital-to-analog converter (DAC); and
an adder;
wherein said FPGA controls said at least one DAC to generate a relatively fast feedforward signal, which is added to a relatively slow feedback signal from said MZM bias controller using said adder to bias said MZM at a null point by tracking a wavelength change and adjusting a bias voltage to said MZM to minimize leakage for all wavelengths.

11. The lidar system of claim 10, wherein said linear detector array is an avalanche photodiode (APD) linear detector array; and
wherein an "m" by "n" pixel detector chip is bonded on top of an "m" by "n" transimpedance amplifier (TIA) array, and a plurality of TIAs in each column of "m" pixels are combined with a summer into a single signal for each super pixel.

12. The lidar system of claim 11, wherein said linear detector array includes a single photon sensitive mercury-cadmium-telluride (HgCdTe) APD detector array with up to 320 super pixels.

13. The lidar system of claim 12, wherein said linear detector array includes a readout integrated circuit (ROIC) Which includes an "n" to "$2n_{track}$" RF switch fabric which is dynamically configured to connect "$2n_{track}$" out of "n" switch inputs selected arbitrarily to "$2n_{track}$" switch outputs, to reduce a number of ROIC output signals;
wherein said "n" switch inputs are connected to outputs of "n" super pixels such that said RF switch fabric brings out signals from "$2n_{track}$" super pixels arbitrarily illuminated by "$n_{track}$" tracks of footprints on said surface;
wherein "n" is configured to be 320 and "$2n_{track}$" is configured to be 60 for 30 tracks of footprints; and
wherein said switch fabric is controlled by said FPGA and reconfigured when surface footprint locations are changed dynamically.

14. The lidar system of claim 13, wherein said laser beam transmitted to said surface sweeps contiguous footprints in a swath for gapless 3D imaging on an airless body, and said RF switch fabric in said ROIC of said linear detector array is modified to track said laser beam with no more than four switch outputs; and
wherein outputs of said modified RF switch fabric are dynamically connected to a group of contiguous detector super pixels onto which a moving laser footprint is imaged.

15. The lidar system of claim 14, wherein on condition that said group contains only two super pixels to image said footprint, a number of ROIC output signals is reduced to two.

16. The lidar system of claim 15, wherein upon each switch trigger from said FPGA, on condition that a laser footprint image moves out a trailing super pixel in said group, a switch output connected to said trailing super pixel is switched to a super pixel ahead of and adjacent to a leading super pixel of said group, to track said moving laser footprint image; and
wherein said modified RF switch fabric wraps around to a beginning of a super pixel array when reaching an end of said super pixel array.

17. The lidar system of claim 13, wherein gapless swath-mapping of said surface is performed by repeating a set of interlaced wavelength sweeps to mitigate cloud folding from a cloud top up to 19 km while allowing a plurality of said laser pulses to be transmitted within each sweep duration as low as 125 µs;
wherein a plurality of said footprints illuminated in a wavelength sweep are imaged onto different super pixels of said linear detector array and said footprints are shifted by one footprint full-width-at-half-maximum (FWHM) in a following sweep to form said gapless 3D imaging; and
wherein successive sweeps are separated by more than 125 µs such that-intervals of consecutive pulses on each super pixel of said linear detector array are more than 125 µs.

* * * * *